US012732253B2

(12) United States Patent
Raghavan et al.

(10) Patent No.: US 12,732,253 B2
(45) Date of Patent: Sep. 8, 2026

(54) SPHERICAL COVERAGE REQUIREMENTS WITH A COST ON BEAM LEARNING

(71) Applicant: QUALCOMM Incorporated, San Diego, CA (US)

(72) Inventors: Vasanthan Raghavan, West Windsor Township, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 18/362,697

(22) Filed: Jul. 31, 2023

(65) Prior Publication Data

US 2025/0047350 A1 Feb. 6, 2025

(51) Int. Cl.
*H04B 7/06* (2006.01)
*H04B 7/0426* (2017.01)
*H04W 28/02* (2009.01)

(52) U.S. Cl.
CPC ........... *H04B 7/0628* (2013.01); *H04B 7/043* (2013.01); *H04W 28/0215* (2013.01)

(58) Field of Classification Search
None
See application file for complete search history.

(56) References Cited

U.S. PATENT DOCUMENTS 7,773,964 B2 * 8/2010 Ozaki .................... G01R 29/10 455/226.1
7,925,253 B2 * 4/2011 Breit ..................... H04W 56/00 455/418
8,467,756 B2 * 6/2013 Ozaki .................... G01R 29/10 455/226.1
10,826,624 B1 * 11/2020 Lin ...................... H04B 17/102
10,855,341 B2 * 12/2020 Lim ...................... H04B 7/088
10,924,164 B2 * 2/2021 Brunel ................. H04B 7/0695
11,070,279 B2 * 7/2021 Raghavan ............ H04B 7/0417
11,122,518 B2 * 9/2021 Jung ..................... H04W 52/34
11,139,558 B2 * 10/2021 Cho ...................... H01Q 1/243
11,323,158 B2 * 5/2022 Brunel ................. H04B 7/0426
(Continued)

FOREIGN PATENT DOCUMENTS

AU 2020294188 A1 * 7/2021 ............... H04B 1/40
AU 2020294188 B2 * 12/2021 ............... H01Q 1/38
(Continued)

OTHER PUBLICATIONS

B.M. Lee, Simplified Antenna Group Determination of RS Overhead Reduced Massive MIMO for Wireless Sensor Netowrks, Dec. 2017 (Year: 2017).*

*Primary Examiner* — Berhanu Tadese
(74) *Attorney, Agent, or Firm* — Patterson & Sheridan LLP

(57) ABSTRACT

Certain aspects of the present disclosure provide a method for wireless communications at a user equipment (UE). The UE may transmit signaling indicating capability information corresponding to one or more antenna arrays of the UE. The capability information may include a number of the one or more antenna arrays, a number of antennas in each antenna array, and/or a geometric shape of each antenna array. The UE may then receive an indication of a modified performance objective for beamforming. The modified performance objective is based on the capability information and is different from a standard performance objective for the beamforming.

30 Claims, 13 Drawing Sheets

(56) References Cited

U.S. PATENT DOCUMENTS

| | | | | |
|---|---|---|---|---|
| 11,522,274 | B2 * | 12/2022 | Hakola | H01Q 1/246 |
| 11,540,146 | B2 * | 12/2022 | Barabash | H04B 7/0686 |
| 11,563,469 | B2 * | 1/2023 | Brunel | H04B 7/0695 |
| 11,595,908 | B2 * | 2/2023 | Takahashi | H04W 52/146 |
| 11,664,874 | B2 * | 5/2023 | Tang | H04B 7/0695 |
| | | | | 375/262 |
| 11,757,543 | B2 * | 9/2023 | Chervyakov | H04B 17/29 |
| | | | | 370/252 |
| 11,777,581 | B2 * | 10/2023 | Yang | H04B 7/06954 |
| | | | | 375/262 |
| 11,784,677 | B2 * | 10/2023 | Yang | H04B 1/52 |
| | | | | 455/78 |
| 11,818,671 | B2 * | 11/2023 | Yang | H04W 52/367 |
| 11,923,601 | B2 * | 3/2024 | Cho | H03F 3/211 |
| 11,943,758 | B2 * | 3/2024 | Hirzallah | H04W 72/046 |
| 11,962,098 | B2 * | 4/2024 | Horn | H01Q 3/245 |
| 12,089,166 | B2 * | 9/2024 | Yang | H04W 4/40 |
| 12,120,619 | B2 * | 10/2024 | Oguma | H04W 52/42 |
| 12,363,555 | B2 * | 7/2025 | Wang | H04W 16/28 |
| 12,425,079 | B2 * | 9/2025 | Raghavan | H04B 7/0602 |
| 12,438,625 | B2 * | 10/2025 | Yang | H04W 72/0473 |
| 12,457,562 | B2 * | 10/2025 | Yang | H04B 17/102 |
| 12,494,591 | B2 * | 12/2025 | Jakobsson | H01Q 21/29 |
| 2013/0231060 | A1 * | 9/2013 | Ozaki | G01R 29/10 |
| | | | | 455/67.11 |
| 2020/0195336 | A1 * | 6/2020 | Raghavan | H04B 7/0874 |
| 2021/0076228 | A1 * | 3/2021 | Han | H04B 7/0882 |
| 2021/0109145 | A1 * | 4/2021 | Haustein | G01R 29/0871 |
| 2021/0314062 | A1 * | 10/2021 | Kakishima | H04B 7/088 |
| 2021/0336707 | A1 * | 10/2021 | Chervyakov | H04B 17/0085 |
| 2021/0344408 | A1 * | 11/2021 | Raghavan | H04B 7/0874 |
| 2022/0052747 | A1 * | 2/2022 | Tang | H04B 7/0695 |
| 2022/0070794 | A1 * | 3/2022 | Lim | H04B 1/3838 |
| 2022/0132325 | A1 * | 4/2022 | Zhou | H04B 7/063 |
| 2022/0150844 | A1 * | 5/2022 | Yang | H04W 52/38 |
| 2022/0311495 | A1 * | 9/2022 | Yang | H04B 7/0617 |
| 2022/0330039 | A1 * | 10/2022 | Wang | H04W 8/22 |
| 2022/0330179 | A1 * | 10/2022 | Takahashi | H04W 52/367 |
| 2022/0416447 | A1 * | 12/2022 | Jakobsson | H01Q 21/29 |
| 2023/0142772 | A1 * | 5/2023 | Johansson | H01Q 21/26 |
| | | | | 342/372 |
| 2023/0224823 | A1 * | 7/2023 | Yang | H04W 52/367 |
| | | | | 455/522 |
| 2024/0023154 | A1 * | 1/2024 | Raghavan | H04W 72/541 |
| 2024/0063864 | A1 * | 2/2024 | Li | H04B 7/0617 |
| 2024/0064650 | A1 * | 2/2024 | Oguma | H04W 8/22 |
| 2024/0196431 | A1 * | 6/2024 | Hirzallah | H04W 24/08 |
| 2024/0205896 | A1 * | 6/2024 | Demonget | H04W 72/0473 |
| 2024/0297695 | A1 * | 9/2024 | Enescu | H04B 7/0617 |
| 2025/0047350 | A1 * | 2/2025 | Raghavan | H04W 28/0215 |
| 2025/0062803 | A1 * | 2/2025 | Raghavan | H04B 7/0602 |
| 2025/0071569 | A1 * | 2/2025 | Raghavan | H04B 7/0628 |
| 2025/0080182 | A1 * | 3/2025 | Raghavan | H04B 7/0695 |
| 2025/0274199 | A1 * | 8/2025 | Frank | H04B 17/203 |
| 2025/0293755 | A1 * | 9/2025 | Frank | H04B 7/0404 |

FOREIGN PATENT DOCUMENTS

| | | | | | |
|---|---|---|---|---|---|
| CA | 2585415 | A1 | * | 5/2006 | H04B 17/29 |
| CN | 101088016 | A | * | 12/2007 | |
| CN | 100592090 | C | * | 2/2010 | |
| CN | 106104969 | A | * | 11/2016 | B60L 53/124 |
| CN | 109923800 | A | * | 6/2019 | H04W 72/51 |
| CN | 111742572 | A | * | 10/2020 | H04B 7/088 |
| CN | 112639493 | A | * | 4/2021 | H04B 7/06966 |
| CN | 112789919 | A | * | 5/2021 | H04B 7/06952 |
| CN | 113054421 | A | * | 6/2021 | H01Q 1/243 |
| CN | 113169769 | A | * | 7/2021 | H04W 8/24 |
| CN | 113439410 | A | * | 9/2021 | H04B 7/06966 |
| CN | 114223227 | A | * | 3/2022 | H04W 52/265 |
| CN | 114223228 | A | * | 3/2022 | H04W 52/42 |
| CN | 111742572 | B | * | 5/2022 | H04B 7/088 |
| CN | 115150948 | A | * | 10/2022 | H04W 72/0473 |
| CN | 116134742 | A | * | 5/2023 | H04B 7/06966 |
| CN | 116783914 | A | * | 9/2023 | H04W 52/28 |
| CN | 113054421 | B | * | 10/2023 | H01Q 1/38 |
| CN | 117378154 | A | * | 1/2024 | H04W 24/08 |
| CN | 117378263 | A | * | 1/2024 | H04W 74/0808 |
| CN | 114223227 | B | * | 3/2024 | H04W 52/0216 |
| CN | 113169769 | B | * | 4/2024 | H04W 8/24 |
| CN | 114223228 | B | * | 4/2024 | H04B 17/102 |
| CN | 118157720 | A | * | 6/2024 | H04W 8/24 |
| CN | 118435666 | A | * | 8/2024 | H04W 52/42 |
| CN | 113439410 | B | * | 1/2025 | H04B 7/06966 |
| CN | 119497969 | A | * | 2/2025 | H04W 72/21 |
| CN | 113748622 | B | * | 6/2025 | H04B 17/21 |
| CN | 112639493 | B | * | 7/2025 | H04B 7/06952 |
| CN | 116134742 | B | * | 9/2025 | H04B 7/06966 |
| EP | 3787204 | A1 | * | 3/2021 | H04B 17/191 |
| EP | 3836665 | A1 | * | 6/2021 | H04B 7/06952 |
| EP | 3843283 | A2 | * | 6/2021 | H01Q 1/2225 |
| EP | 3787204 | B1 | * | 12/2021 | H04B 17/191 |
| EP | 4017049 | A1 | * | 6/2022 | H04W 8/24 |
| EP | 4017050 | A1 | * | 6/2022 | H04W 52/42 |
| EP | 3843283 | B1 | * | 2/2023 | H01Q 21/065 |
| EP | 4210229 | A2 | * | 7/2023 | H01Q 1/38 |
| EP | 4017049 | B1 | * | 1/2025 | H04W 52/42 |
| EP | 4513989 | A1 | * | 2/2025 | H04W 52/367 |
| EP | 4316114 | B1 | * | 11/2025 | H04W 72/0473 |
| JP | 2023123556 | A | * | 9/2023 | H04B 7/06952 |
| KR | 20070085464 | A | * | 8/2007 | H04B 17/29 |
| KR | 20090068238 | A | * | 6/2009 | H04B 17/191 |
| KR | 20220078577 | A | * | 6/2022 | H04W 72/0473 |
| KR | 20230029625 | A | * | 3/2023 | H04B 7/06966 |
| KR | 20230040958 | A | * | 3/2023 | H04B 17/29 |
| KR | 20230084281 | A | * | 6/2023 | H04B 17/102 |
| KR | 20230108229 | A | * | 7/2023 | H04W 72/0453 |
| KR | 20230108230 | A | * | 7/2023 | H04W 52/28 |
| KR | 20230127211 | A | * | 8/2023 | H04B 7/06952 |
| TW | 200838180 | A | * | 9/2008 | |
| WO | WO-2006047677 | A1 | * | 5/2006 | H04B 17/29 |
| WO | WO-2008031112 | A2 | * | 3/2008 | H04B 17/191 |
| WO | WO-2019231823 | A1 | * | 12/2019 | H04W 52/42 |
| WO | WO-2019243449 | A2 | * | 12/2019 | H04B 17/11 |
| WO | WO-2020018118 | A1 | * | 1/2020 | H01Q 3/2611 |
| WO | WO-2020031342 | A1 | * | 2/2020 | H04B 7/06952 |
| WO | WO-2020033643 | A1 | * | 2/2020 | H04B 17/336 |
| WO | WO-2020064267 | A1 | * | 4/2020 | H04W 52/0229 |
| WO | WO-2020123088 | A1 | * | 6/2020 | H04W 8/24 |
| WO | WO-2020155150 | A1 | * | 8/2020 | H04W 72/51 |
| WO | WO-2020166807 | A1 | * | 8/2020 | H04W 52/367 |
| WO | WO-2020168268 | A1 | * | 8/2020 | H04B 17/21 |
| WO | WO-2020168350 | A1 | * | 8/2020 | H04B 7/06966 |
| WO | WO-2020206472 | A2 | * | 10/2020 | H04B 7/06966 |
| WO | WO-2021002634 | A1 | * | 1/2021 | H04B 7/0628 |
| WO | WO-2021002678 | A1 | * | 1/2021 | H04W 4/40 |
| WO | WO-2021029084 | A1 | * | 2/2021 | H04W 52/42 |
| WO | WO-2021029085 | A1 | * | 2/2021 | H04B 17/102 |
| WO | WO-2021045907 | A1 | * | 3/2021 | H04B 7/0696 |
| WO | WO-2021108817 | A2 | * | 6/2021 | H04B 7/06952 |
| WO | WO-2021121634 | A1 | * | 6/2021 | H01Q 21/29 |
| WO | WO-2021133096 | A1 | * | 7/2021 | H01Q 1/2283 |
| WO | WO-2021156994 | A1 | * | 8/2021 | H04W 16/28 |
| WO | WO-2021188024 | A1 | * | 9/2021 | H01Q 3/36 |
| WO | WO-2021236380 | A1 | * | 11/2021 | H04B 7/0617 |
| WO | WO-2021261847 | A1 | * | 12/2021 | H04B 7/06966 |
| WO | WO-2022019534 | A1 | * | 1/2022 | H04B 17/29 |
| WO | WO-2022082935 | A1 | * | 4/2022 | H01Q 21/30 |
| WO | WO-2022149942 | A1 | * | 7/2022 | H04L 5/0091 |
| WO | WO-2022153467 | A1 | * | 7/2022 | H04W 8/22 |
| WO | WO-2022211252 | A1 | * | 10/2022 | H04W 72/0473 |
| WO | WO-2022235287 | A1 | * | 11/2022 | H04B 17/104 |
| WO | WO-2023274524 | A1 | * | 1/2023 | H04B 7/0848 |
| WO | WO-2023130328 | A1 | * | 7/2023 | H04W 52/42 |
| WO | WO-2023204557 | A1 | * | 10/2023 | H04W 52/367 |
| WO | WO-2023209558 | A1 | * | 11/2023 | H04B 17/102 |
| WO | WO-2023209559 | A1 | * | 11/2023 | H04W 52/367 |
| WO | WO-2024015688 | A1 | * | 1/2024 | H04B 7/0617 |
| WO | WO-2024034985 | A1 | * | 2/2024 | H04B 7/0617 |
| WO | WO-2025053991 | A1 | * | 3/2025 | H04L 5/0048 |

* cited by examiner

800

Illustrative EIRP and EIS Specs for n261 at 100th, 50th and 20th %Tile Points of the Sphere

| | EIRP Specs (in dBm) | | EIS Specs (in dBm) | |
|---|---|---|---|---|
| | No Cost | $EIRP_{eff}$ | No Cost | $EIS_{eff}$ |
| 100th %Tile | 25.9 | 25.9 | -95.5 | -95.5 |
| 50th %Tile | 18.9 | 18.9 | -88.5 | -88.5 |
| 20th %Tile | 14.0 | **11.0** | -83.5 | **-80.5** |

Modified Modified

*FIG. 8*

SPHERICAL COVERAGE REQUIREMENTS WITH A COST ON BEAM LEARNING

BACKGROUND

Field of the Disclosure

Aspects of the present disclosure relate to wireless communications, and more particularly, to techniques for managing beamforming-based coverage objectives.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes transmitting signaling indicating capability information corresponding to one or more antenna arrays of the UE; and receiving an indication of a modified (or enhanced) performance objective for beamforming that is different from a standard performance objective indicating a first number of reference signals (RSs) required to achieve preferred performances at different percentile levels of a sphere around the UE, wherein the modified performance objective is based on the capability information and indicates a second number of RSs required to achieve the preferred performances at the different percentile levels of the sphere.

Another aspect provides a method for wireless communications at a network entity. The method includes receiving signaling indicating capability information corresponding to one or more antenna arrays of a UE; and transmitting, to the UE, an indication of a modified (or enhanced) performance objective for beamforming that is different from a standard performance objective indicating a first number of RSs required to achieve preferred performances at different percentile levels of a sphere around the UE, wherein the modified performance objective is based on the capability information and indicates a second number of RSs required to achieve the preferred performances at the different percentile levels of the sphere.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 8 depicts a table showing example effective isotropic radiated power (EIRP) and effective isotropic sensitivity (EIS) values at different percentile points over a sphere around a UE.

DETAILED DESCRIPTION

Figure 1:
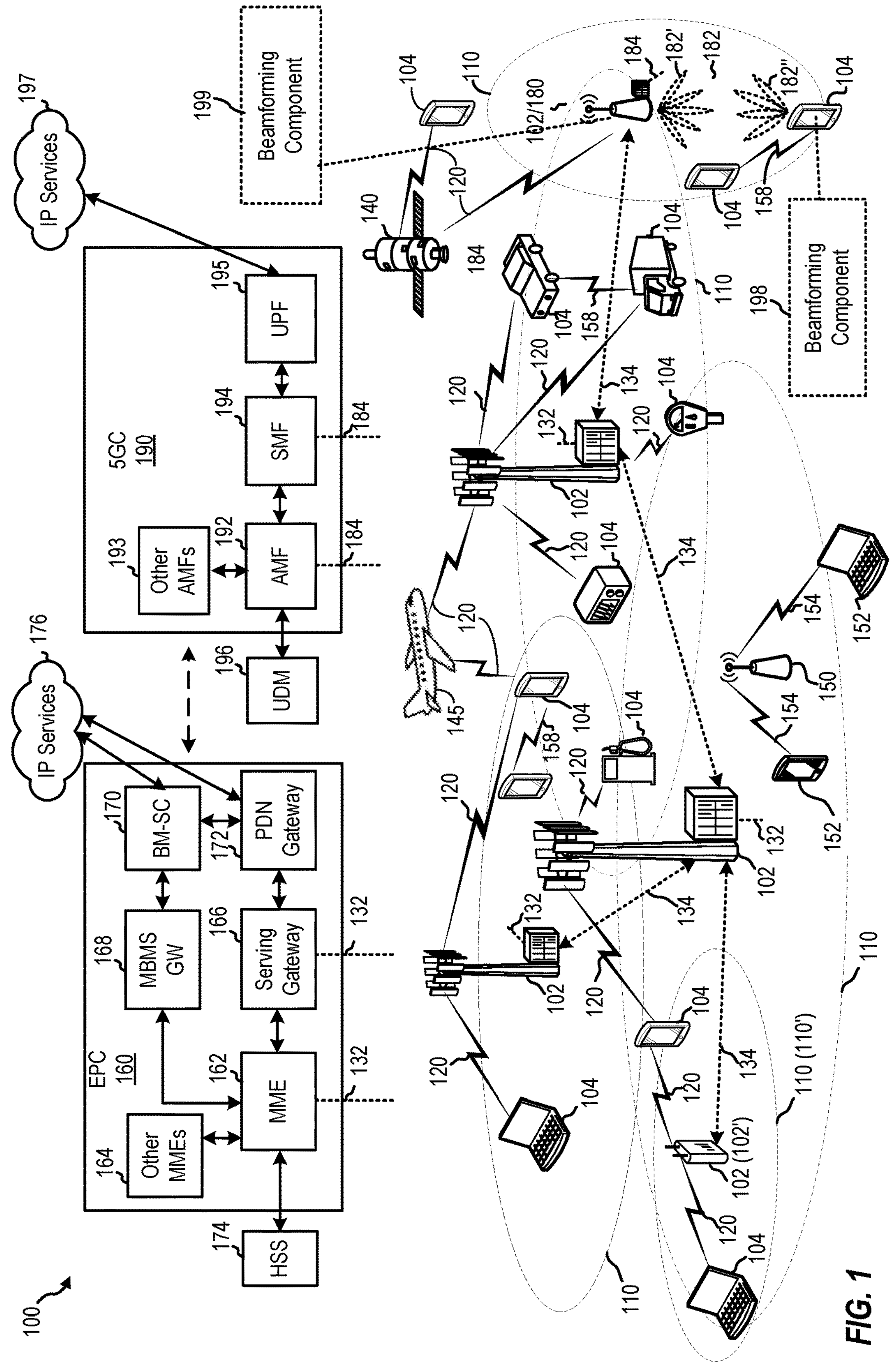
FIG. 1 depicts an example wireless communications network.

Aspects of the present disclosure provide apparatuses, methods, processing systems, and computer-readable mediums for managing beamforming-based coverage objectives.

In millimeter wave (mmW) systems, beamforming technologies are used to increase antenna array gain. Increases in the antenna array gain facilitate a better quality of signal transmission and reception. For example, devices such as a user equipment (UE) and a network entity (e.g., a gNodeB (gNB)) using wireless communication technologies may include antenna arrays. To provide the antenna array gain of the antenna arrays in a particular direction, beamforming is considered. Beamforming is a technique that utilizes advanced antenna technologies on both the UE and the gNB to focus a wireless signal according to a set of beam weights (e.g., in a specific direction), rather than broadcasting to a wide area.

A channel between the UE and the gNodeB may be characterized by multiple clusters corresponding to reflections or scattering from physical objects in the channel environment. Since azimuth angle of arrival (AOA) and zenith angle of arrival (ZOA) of signals from the clusters are expected to be from any direction at the UE side (e.g., due to ground bounces, reflections from different objects, etc.), array gain metrics for the UE may include an array gain over a sphere around the UE. This may be referred to as a spherical coverage of effective isotropic radiated power (EIRP) and/or effective isotropic sensitivity (EIS) in either a transmit mode or a receive mode at the UE side.

Spherical coverage objectives for the UE are specified in terms of different percentile levels (e.g., $20^{th}$, $50^{th}$ percentile levels or peak performance) of the EIRP/EIS over the sphere around the UE. In some cases, a network operator may impose a specific spherical coverage objective for an original equipment manufacturer (OEM) to meet to be admitted into the network (e.g., to realize specific gain values at the $20^{th}$ percentile level of the EIRP/EIS over the sphere around the UE, to ensure good Frequency Range 2 (FR2) performance of the UE).

Currently, the spherical coverage objectives are specified for UEs, which include multiple antenna arrays. As OEMs move from the use of multiple antenna arrays for the UE to a single antenna array for the UE, the network operator-driven spherical coverage objective at a lower percentile level of the EIRP/EIS over the sphere around the UE can be onerous to meet. For example, when the UE may include a single linear or planar antenna array, the specific spherical coverage objective (i.e., to realize the specific gain values for the $20^{th}$ percentile level of the EIRP/EIS over the sphere around the UE) cannot be met with a directional beamforming codebook.

Techniques proposed herein may enable a gNB to dynamically modify and enhance a standard (e.g., spherical) coverage objective, for example, of EIRP and/or EIS at different percentile levels over a sphere for a UE, based on capability information corresponding to one or more antenna arrays of the UE. For example, the UE may receive a modified spherical coverage objective from the gNB, in accordance with its capability information. The modified spherical coverage objective may indicate different amount of reference signals (RSs) required for beam training and beam learning to achieve preferred performances at the different percentile levels of the sphere around the UE and are associated with a cost (or latency) of beam weight learning.

Particular aspects of the subject matter described in this disclosure can be implemented to realize one or more of the following potential advantages. In some examples, the described techniques can lead to a higher array gain corresponding to the antenna arrays of the UE (e.g., without any increased power consumption at the UE, increased UE-specific RS resource allocation at the gNB, etc.). The higher array gain may result in a higher signal strength improvement, which may increase communication reliability and lead to better performance.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
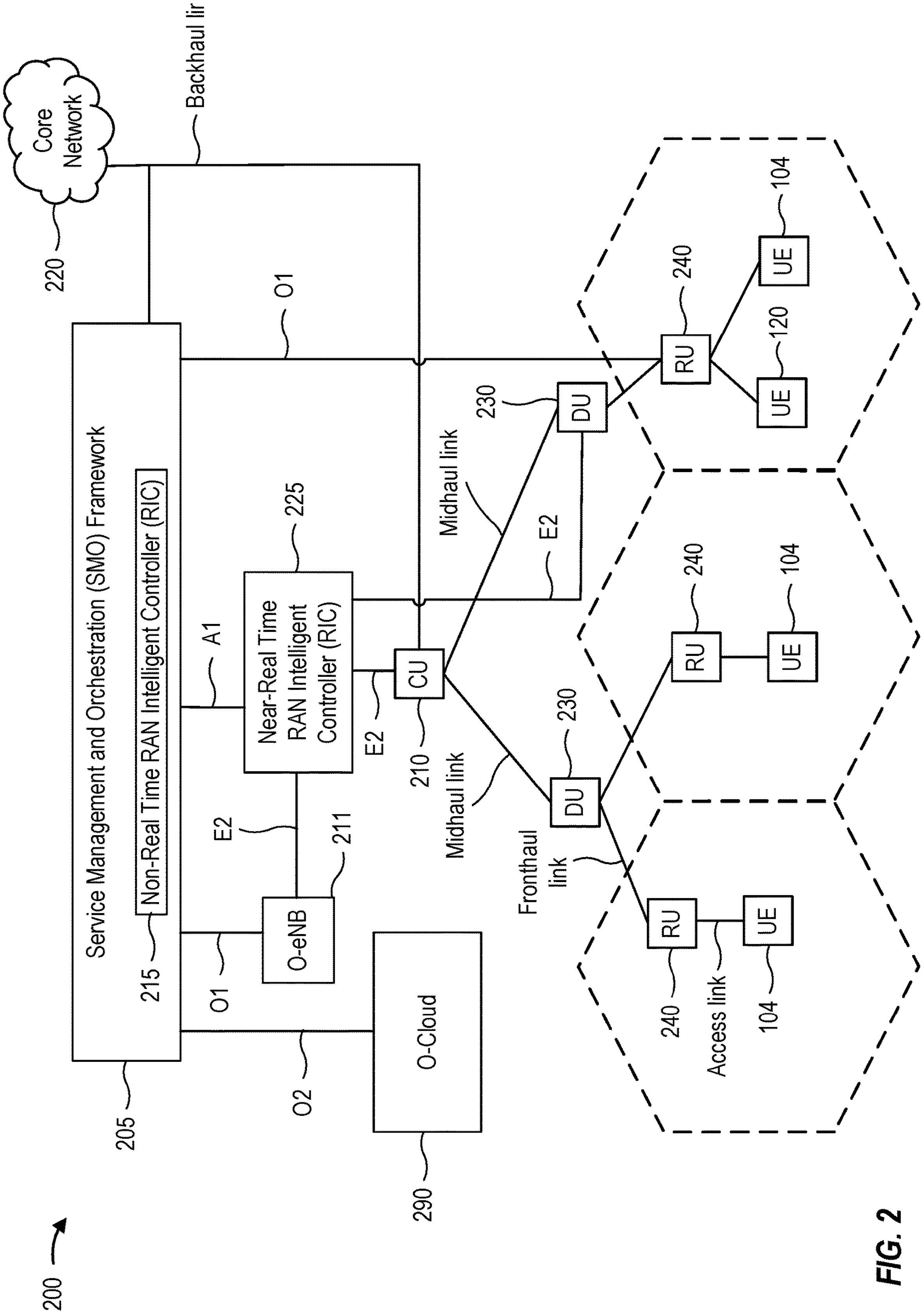
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (Rus), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mm Wave/near mm Wave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 10:
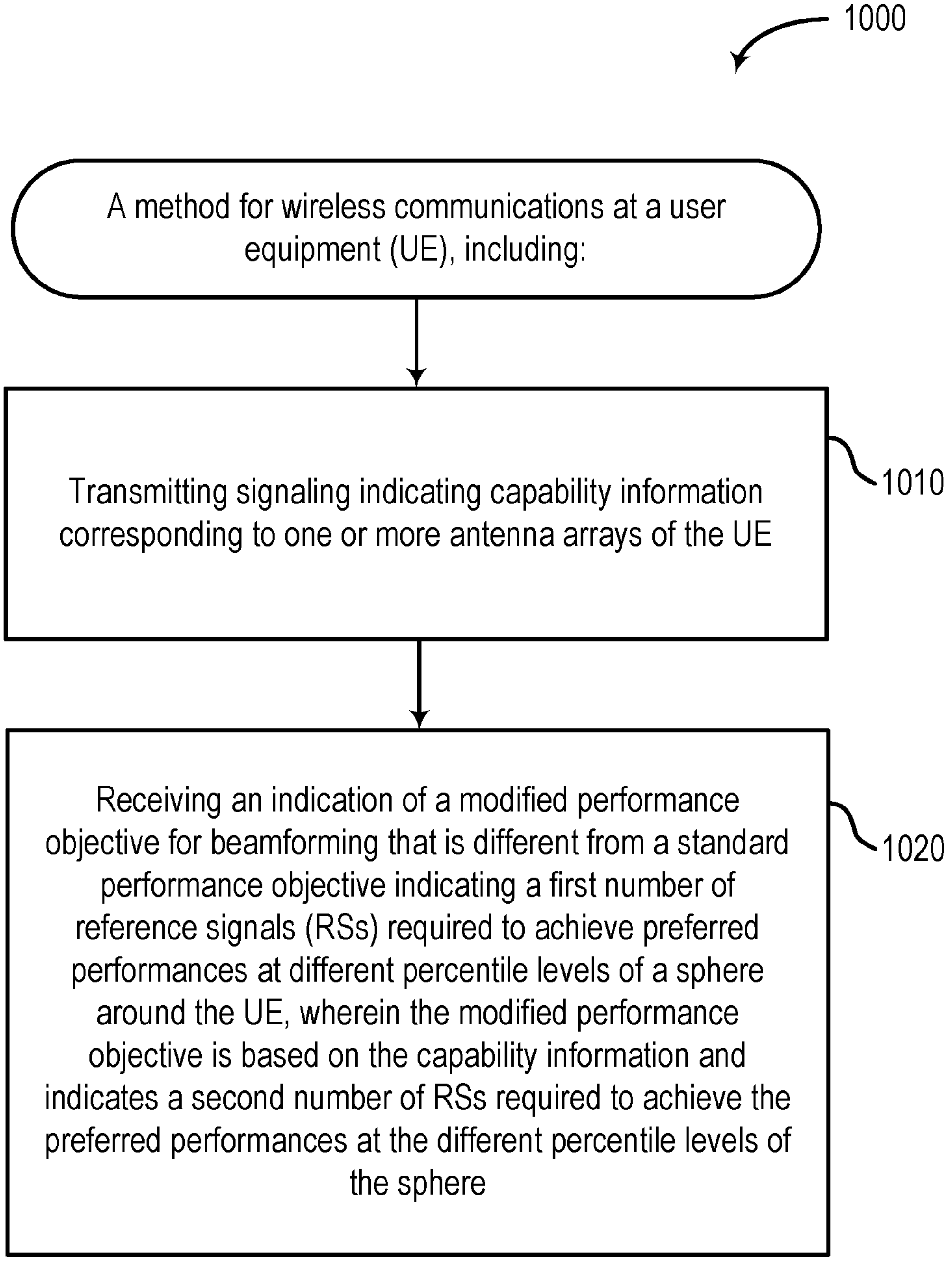
FIG. 10 depicts a method for wireless communications at a UE.

Wireless communication network 100 further includes beamforming component 198, which may be configured to perform method 1000 of FIG. 10. Wireless communication network 100 further includes beamforming component 199, which may be configured to perform method 1100 of FIG. 11.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (Cus) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
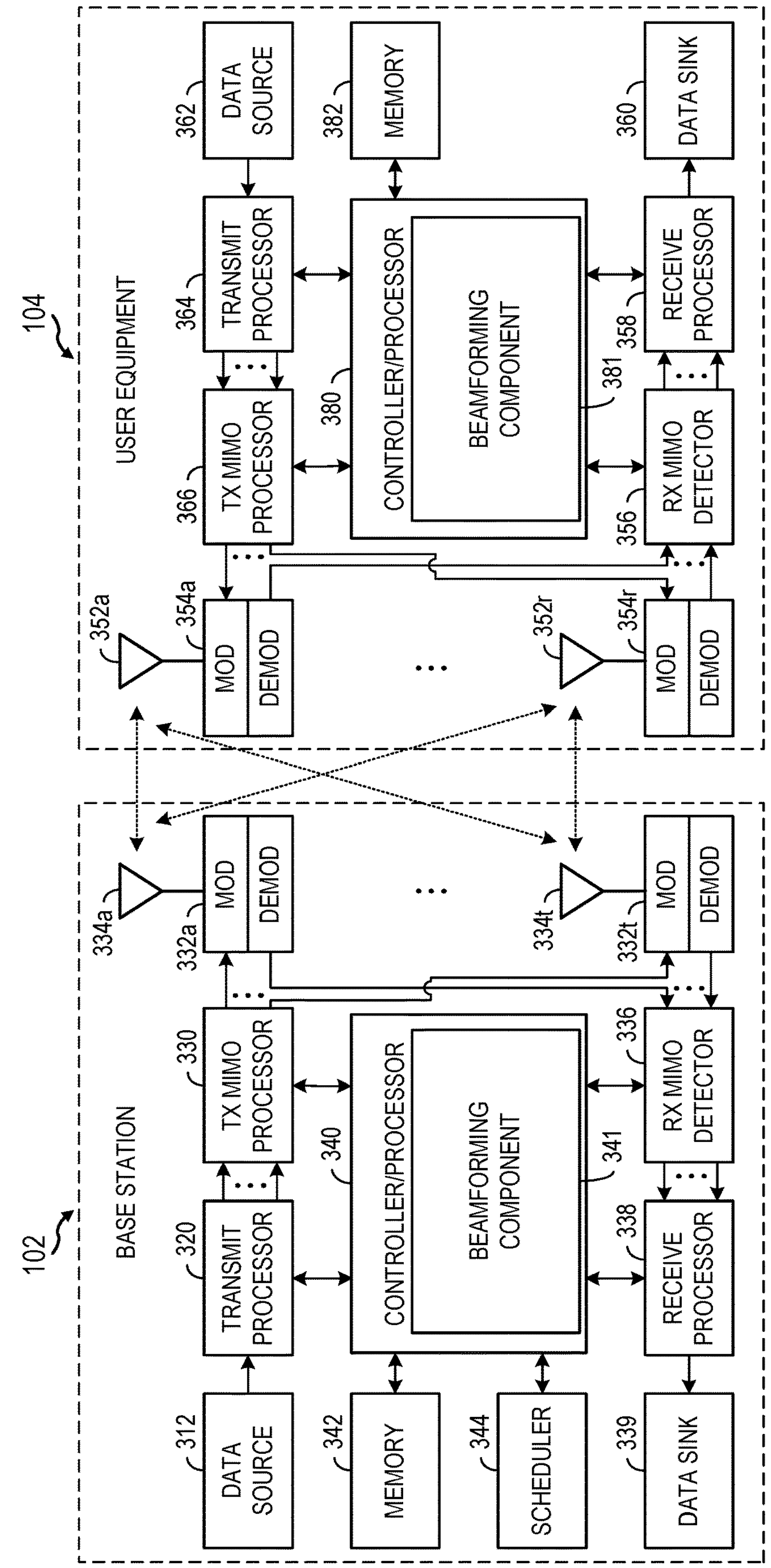
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes beamforming component 341, which may be representative of beamforming component 199 of FIG. 1. Notably, while depicted as an aspect of controller/processor 340, beamforming component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes beamforming component 381, which may be representative of beamforming component 198 of FIG. 1. Notably, while depicted as an aspect of controller/processor 380, beamforming component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figures 4A, 4B, 4C, 4D:
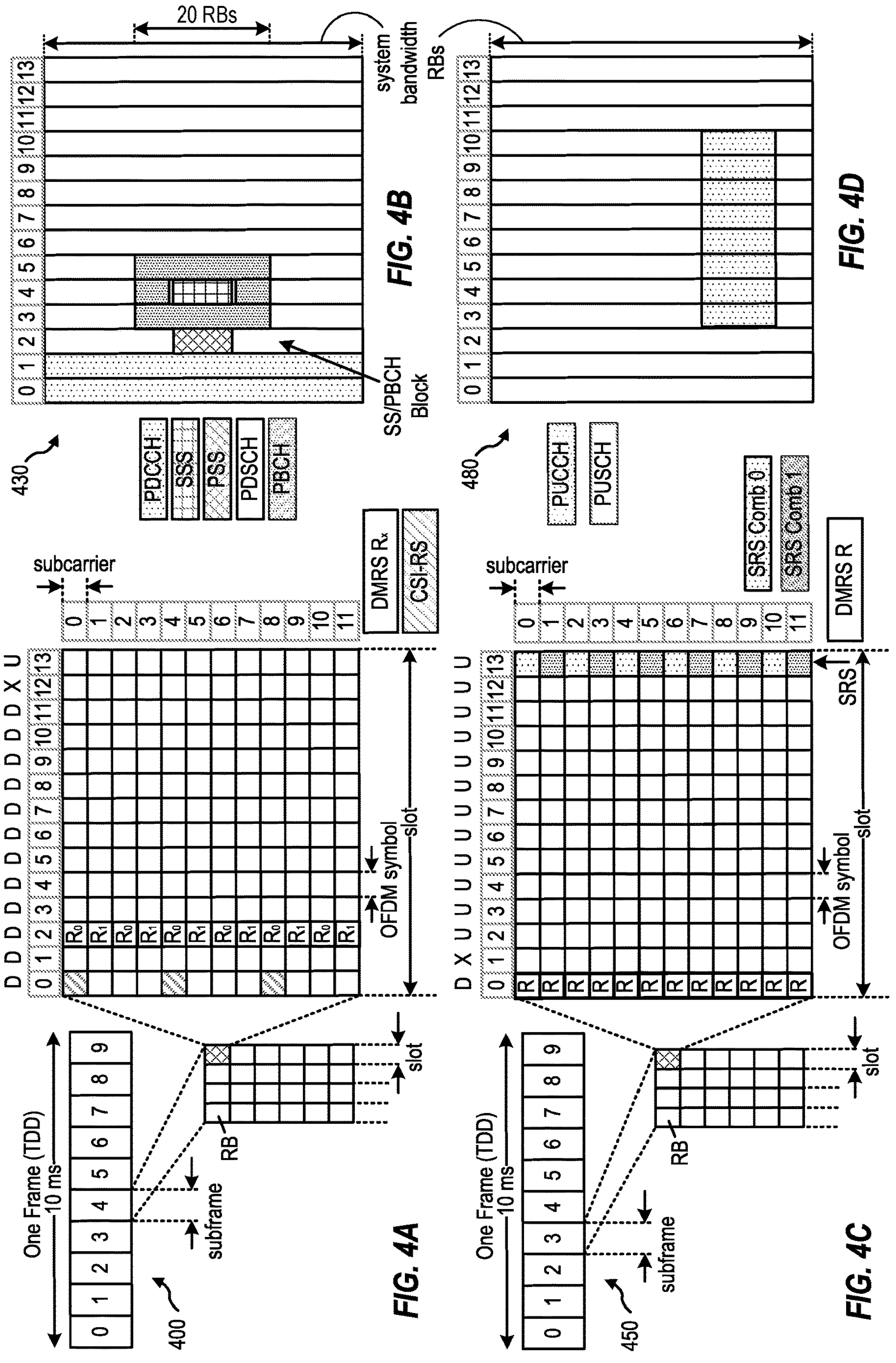
FIG. 4A, FIG. 4B, FIG. 4C, and FIG. 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 2μ slots/subframe. The subcarrier spacing and symbol length/duration are a function of the numerology. The subcarrier spacing may be equal to $2^{\mu}\times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as $3^{rd}$ generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mm Wave/near mm Wave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Beamforming

In millimeter wave (mmW) systems, beamforming technologies are used to increase antenna array gain. For example, devices such as user equipments (UEs) and network entities (e.g., a gNodeB (gNB)) using wireless communication technologies may include multiple antenna arrays. Each antenna array may include one or more transmission and reception antennas that can be co-phased and are configured to transmit and receive communications over one or more spatial streams/beams. The use of the multiple antenna arrays may afford the ability to meet spherical coverage requirements with/without hand/body blockage as well as robustness with beam switching over the antenna arrays.

Increases in the antenna array gain facilitate a better quality of signal transmission and reception. To provide the antenna array gain in a particular direction, beamforming is considered. Beamforming is a technique that utilizes advanced antenna technologies on both UEs and gNBs to focus a wireless signal according to a set of beam weights (e.g., in a specific direction), rather than broadcasting to a wide area. For beamforming at a UE, it usually includes a UE receive (Rx) beam sweep from a set of different beams. Beamforming may improve signal-to-noise ratio (SNR) of received signals, eliminate undesirable interference sources, and focus the transmitted signals to specific locations.

Beamforming is also performed to establish a link between the gNB and the UE, where both these devices form a beam directed towards (but not limited to this possibility) each other. For example, both the gNB and the UE find at least one adequate beam to form a communication link between each other. gNB-beam and UE-beam form what is known as a beam pair link (BPL). As an example, on a downlink (DL), the gNB uses a transmit beam and the UE uses a receive beam corresponding to the transmit beam to receive a DL transmission. The combination of the transmit beam and the corresponding receive beam is the BPL.

The gNB may allocate and configure a fixed number of reference signals (RSs) or beams for the UE (e.g., with one or more antenna arrays) for beamforming. In such cases, an Rx array gain corresponding to the one or more antenna arrays of the UE may be low. The low Rx array gain may result in a lower signal strength improvement (e.g., reference signal received power (RSRP)), which may decrease communication reliability.

Overview of Spherical Coverage

A channel between user equipments (UEs) and network entities (e.g., a gNodeB (gNB)) may be characterized by multiple clusters with each cluster corresponding to a reflection or scattering of signals from the gNB to the UE via a physical object (e.g., vehicles, humans, glass/metallic objects, etc.). Azimuth angle of arrival (AOA) and zenith angle of arrival (ZOA) of signals for each of the cluster can be from any direction at the UE side (e.g., due to ground bounces, reflections from different objects, etc.). Since the AOA and the ZOA of the signals are expected to be from any direction at the UE side, array gain metrics for a UE at a gNB may include an array gain over a sphere around the UE. This is called as a spherical coverage of effective isotropic radiated power (EIRP) and/or effective isotropic sensitivity (EIS).

EIRP is a measurement of a radiated output power from an equivalent isotropic antenna in a single direction. The isotropic antenna is meant to distribute power equally in all directions. When the power of the isotropic antenna is channeled in the single direction, the total power of the isotropic antenna in the single direction is known as the EIRP. In antenna measurements, measured sensitivity over each angle is called the EIS of an antenna in that direction.

The spherical coverage may be specified by a cumulative distribution function (CDF) of the EIRP and/or the EIS, which is a combination of a transmitted power and the array gain. An upper bound and a lower bound of the spherical coverage may be based on electric field (E-field) radiation data of antennas of the antenna arrays.

Spherical coverage objectives/requirements for the UE are specified in terms of a peak performance (e.g., a peak array gain) and different percentile levels (e.g., $20^{th}$, $50^{th}$ percentile levels) of the EIRP/EIS over the sphere around the UE at different frequencies and/or bands. In some cases, a network operator may impose a specific spherical coverage objective for an original equipment manufacturer (OEM) to meet to be admitted into the network (e.g., to realize gain values per current specifications for the $20^{th}$ percentile level of the EIRP/EIS over the sphere around the UE, to ensure good Frequency Range 2 (FR2) performance of the UE).

Figure 5:
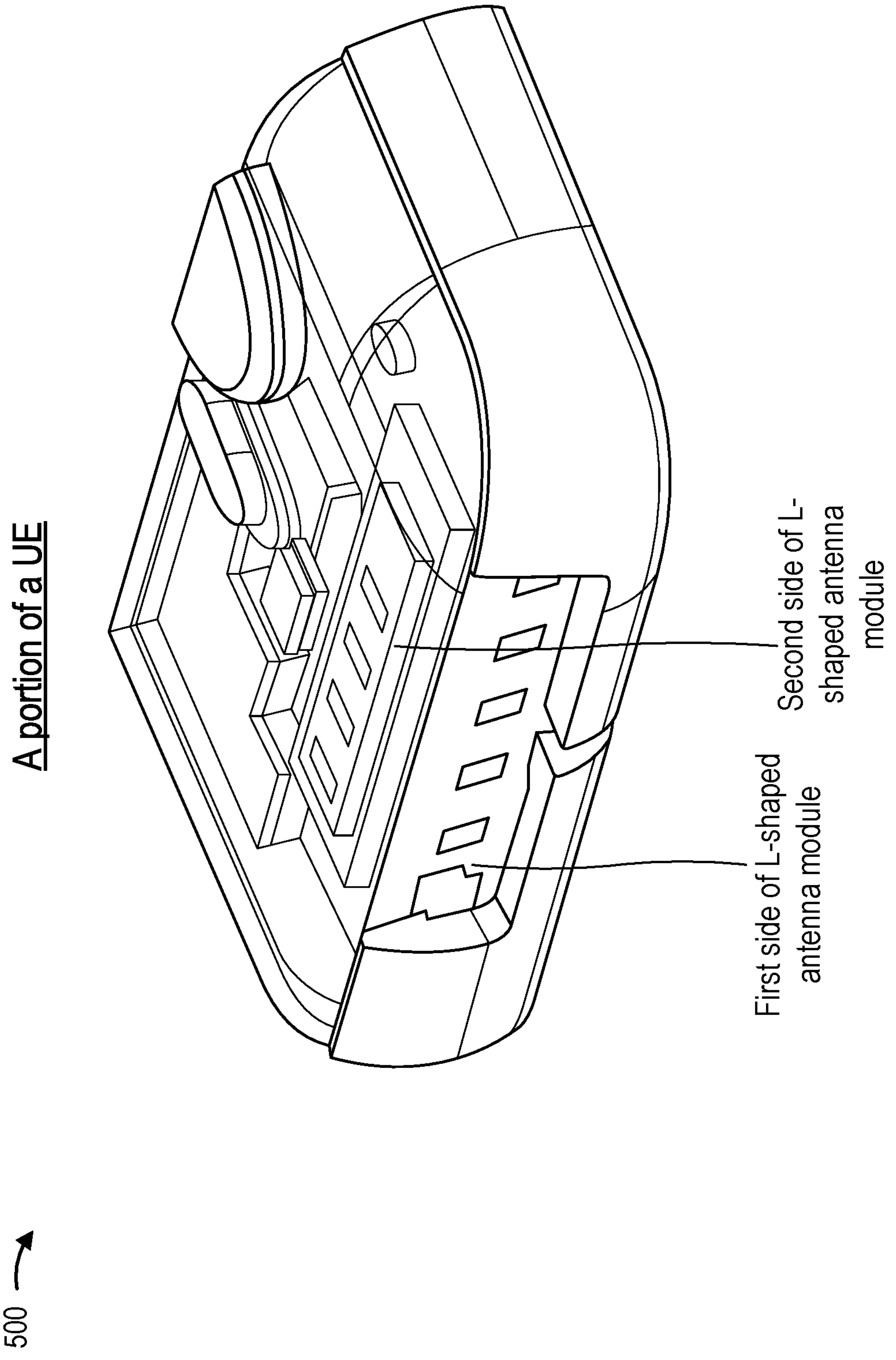
FIG. 5 depicts a portion of a UE with an L-shaped antenna module.

Currently, the spherical coverage objectives are specified for UEs, which include the multiple antenna arrays. As OEMs move from the use of the multiple antenna arrays for the UE to a reduced number of antenna arrays or a single antenna array (e.g., with multiple boresight directions such as L shaped module depicted in a diagram 500 of FIG. 5, a distributed module, a double-L shaped module, etc.) for the UE due to cost and power reasons, the network operator-driven spherical coverage objective at a lower percentile level of the EIRP/EIS over the sphere around the UE can be onerous to meet. For example, when the UE may include a single linear or planar antenna array, the specific spherical coverage objective (i.e., to meet the $20^{th}$ percentile level of the EIRP/EIS over the sphere around the UE) cannot be met with a directional beamforming codebook.

Figure 6:
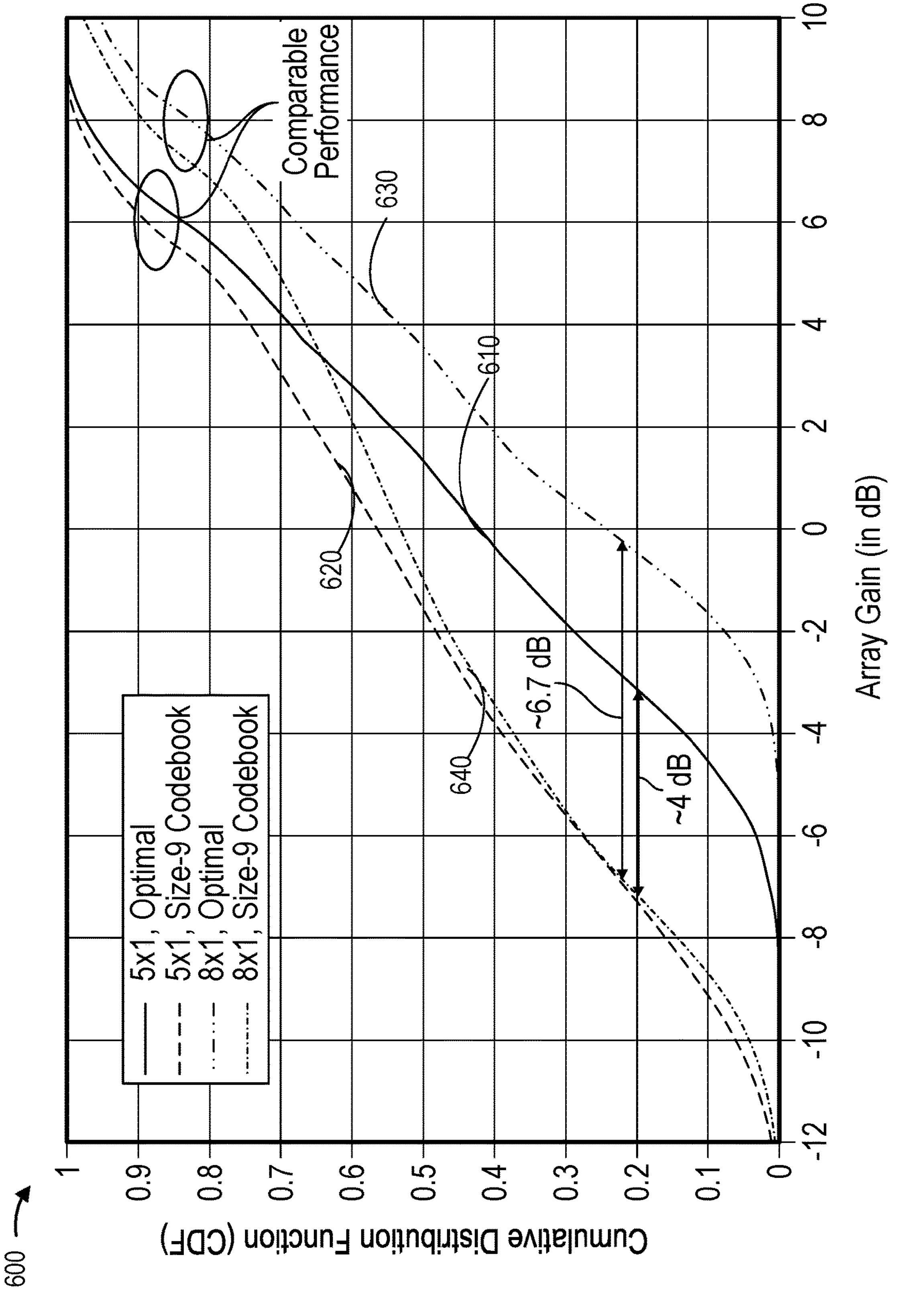
FIG. 6 depicts array gains for different antenna arrays of a UE.

FIG. 6 depicts a diagram 600 showing array gains (directivity) for different antenna arrays of a UE based on different beamforming codebooks. A beamforming codebook may include a set of beams. In one example, the beamforming codebook may be an analog beamforming codebook. In another example, the beamforming codebook may be a hybrid beamforming codebook.

The antenna arrays provide a spherical coverage over the UE. Based on the E-fields of antenna elements of the antenna arrays over an entire sphere, an optimal maximum-ratio combining (MRC) solution consists of maximizing the energy over each direction of the sphere by the appropriate choice of phase shifter and gain state selection for each antenna element.

The diagram 600 includes array gains of a first antenna array (e.g., 5×1 antenna array) with an optimal MRC solution 610, the first antenna array with a size-9 codebook 620, a second antenna array (e.g., 8×1 antenna array) with an optimal MRC solution 630, and the second antenna array with a size-9 codebook 640.

As depicted, the second antenna array with the size-9 codebook 640 has a higher array gain than the first antenna array with the size-9 codebook 620 (e.g., at a top percentile level of the sphere). The higher array gain may provide a higher signal strength, which may increase communication reliability. The second antenna array with the optimal MRC solution 630 has a higher array gain than the second antenna array with the size-9 codebook 640 (e.g., at all percentile levels of the sphere). The first antenna array with the optimal MRC solution 610 has a higher array gain than the first antenna array with the size-9 codebook 620 (e.g., at all percentile levels of the sphere).

For both the first antenna array and the second antenna array, the array gain performance at the top percentile level (e.g., $30^{th}$ percentile level) of the sphere is comparable for the optimal MRC solution as well as the codebook-based solution. However, at a tail percentile level (e.g., bottom $40^{th}$ percentile level) of the sphere, an array gain performance gap between the optimal MRC solution and the codebook-based solution for both the first antenna array and the second antenna array increases dramatically. For example, the array gain performance gap is ~4 dB (e.g., from a peak array gain performance) for the first antenna array case (i.e., between the array gain of the first antenna array with the optimal MRC solution 610 and the array gain of the first antenna array with the size-9 codebook 620) and ~6.7 dB for the 8×1 the second antenna array case (i.e., between the array gain of the second antenna array with the optimal MRC solution 630 and the array gain of the second antenna array with the size-9 codebook 640). That is, there are significant array gain deterioration for the second antenna array case at the tail percentile points of the sphere.

The optimal MRC solution may only be realized in the in-coverage region of each antenna array (e.g., top 30 percentile points of the sphere) of the UE, with a directionally steered beam codebook as a main lobe region of the antenna array and its neighborhood matches with steering directions of the beam codebook. However, in the out-of-coverage region of each antenna array (e.g., tail or bottom 40 percentile level of the sphere) of the UE, the optimal MRC solution cannot be realized with a codebook of beams. This is because each set of beams in the codebook corresponds to a fixed phase relationship across antennas of the antenna arrays. Furthermore, each set of beams in the codebook is loaded from a radio frequency integrated circuit (RFIC) memory and is measured in a single measurement instance.

In some cases, an optimal array gain performance may be realized with adaptive beam weights at the UE, where an appropriate phase relationship of the beam weights can be learned dynamically by the UE. That is, the use of the adaptive antenna weights at the UE can assist the UE move closer to realizing the specific spherical coverage objective.

To learn the adaptive beam weights, the UE may require RS-based beam training which requires RS configuration and grant in the case of UE-specific RSs and configuration in the case of broadcasted RSs. In some cases, a number of RS measurement instances for the adaptive beam weight learning is proportional to array dimensions of the antenna arrays of the UE. The use of the multiple RS measurement instances may lead to increased power consumption (as well as a commensurate thermal overhead) at the UE and increased UE-specific RS resource allocation and coordination (e.g., control overhead) at the gNB. So, cost (i.e., increased power consumption, increased UE-specific RS resource allocation, etc.) associated with bridging the array gain performance gap to the optimal MRC solution at the tail of the sphere can be onerous for both the UE and the gNB. Hence, the specific spherical coverage objective at the tail of the sphere without incorporating the cost associated with meeting this performance ignores practical implementation issues (at both the UE and the gNB).

Aspects Related to Methods for Spherical Coverage Requirements with a Cost on Beam Learning Aspects of the present disclosure provide apparatuses, methods, processing systems, and computer-readable mediums for managing beamforming-based spherical coverage objectives.

Techniques proposed herein may enable a gNodeB (gNB) to dynamically modify and enhance a standard spherical coverage objective of effective isotropic radiated power (EIRP) and/or effective isotropic sensitivity (EIS) at different percentile levels over a sphere for a user equipment (UE), based on capability information corresponding to one or more antenna arrays of the UE. For example, the UE may receive a modified spherical coverage objective from the gNB, in accordance with its capability information. The modified spherical coverage objective may indicate different amount of reference signals (RSs) required to achieve preferred performances at the different percentile levels of the sphere around the UE and are associated with a cost of beam weight learning.

The techniques proposed herein may lead to a higher array gain corresponding to the antenna arrays of the UE (e.g., without any increased power consumption at the UE, increased UE-specific RS resource allocation at the gNB, etc.). The higher array gain may result in a higher signal strength improvement, which may increase communication reliability. The techniques proposed herein for managing the beamforming-based spherical coverage requirements may be understood with reference to FIG. 7-FIG. 13.

Figure 7:
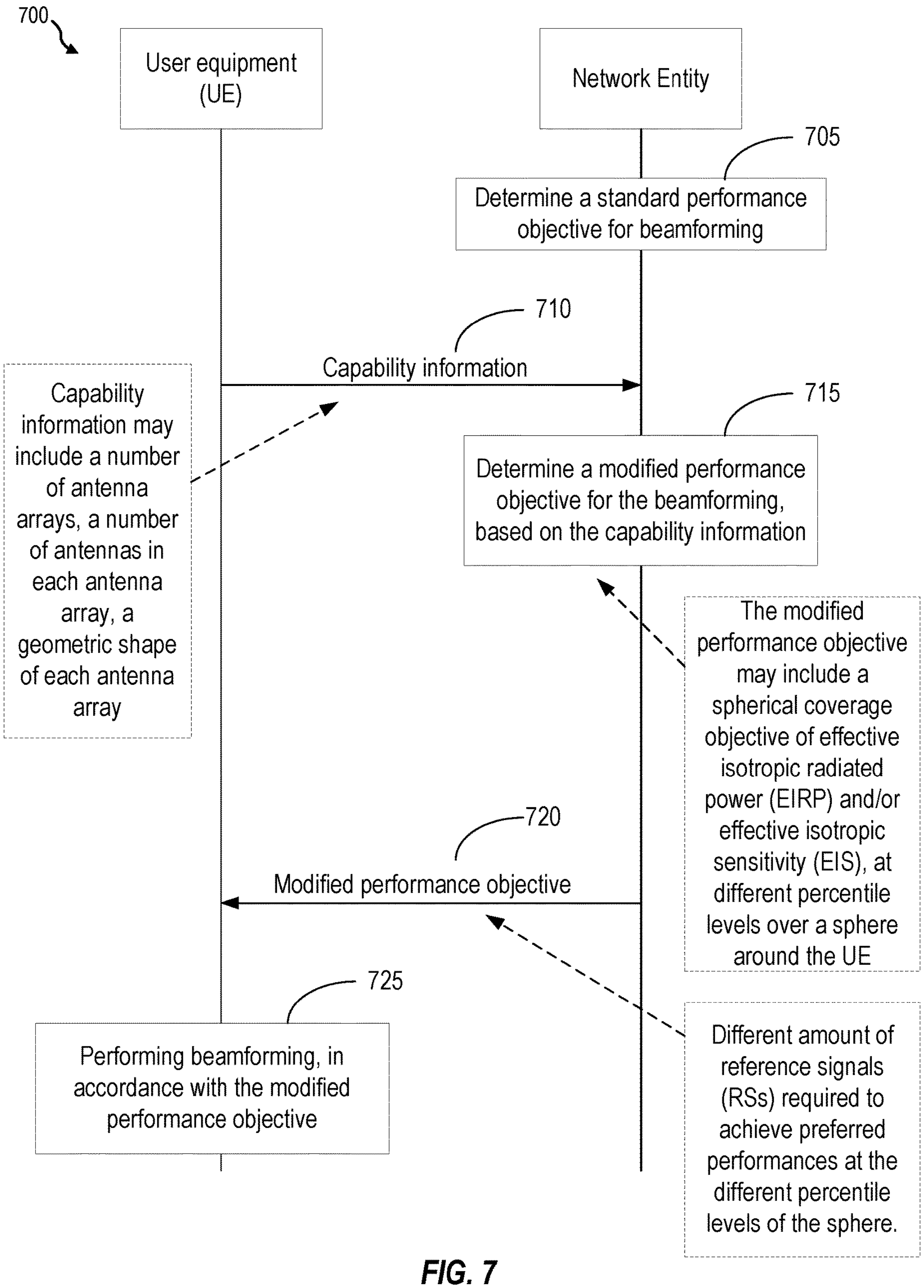
FIG. 7 depicts a call flow diagram illustrating example communication among a UE and a network entity.

FIG. 7 depicts a call flow diagram 700 illustrating example communication among a UE and a network entity (e.g., a gNB) for managing beamforming-based spherical coverage requirements. The UE shown in FIG. 7 may be an example of the UE 104 depicted and described with respect to FIG. 1 and FIG. 3. The gNB depicted in FIG. 7 may be an example of the BS 102 depicted and described with respect to FIG. 1 and FIG. 3, or the disaggregated BS depicted and described with respect to FIG. 2.

As indicated at 705, the gNB determines a standard performance objective (or requirement) for beamforming.

In one aspect, the standard performance objective may indicate a spherical coverage objective of EIRP, at different percentile levels over a sphere around the UE.

In another aspect, the standard performance objective may indicate the spherical coverage objective of EIS, at the different percentile levels over the sphere around the UE.

In another aspect, the standard performance objective may indicate the spherical coverage objective of the EIRP and the EIS, at the different percentile levels over the sphere around the UE. For example, FIG. 8 depicts a table 800 showing values of the EIRP and the EIS (e.g., at no cost of beam weight learning, in accordance with the standard performance objective) at the different percentile levels (e.g., 100, 50, 20 percentile levels) over the sphere around the UE.

Referring back to FIG. 7, as indicated at 710, the UE transmits capability information to the gNB. The capability information can correspond to the availability and use of one or more antenna arrays of the UE.

In one aspect, the capability information may indicate a number of the one or more antenna arrays of the UE. In one example, the capability information may indicate three antenna arrays. In another example, the capability information may indicate five antenna arrays.

In another aspect, the capability information may indicate a number of antennas in each of the one or more antenna arrays of the UE. In one example, the capability information may indicate two antennas in a first antenna array of the UE. In another example, the capability information may further indicate five antennas in a second antenna array of the UE.

In another aspect, the capability information may indicate a geometric shape of each of the one or more antenna arrays of the UE. In one example, the capability information may indicate a first geometric shape (e.g., L shape) of a first antenna array of the UE. In another example, the capability information may indicate a second geometric shape (e.g., double-L shape or a planar shape) of a second antenna array of the UE.

As indicated at 715, the gNB determines a modified or enhanced performance objective for the beamforming, based on the capability information of the UE. The modified performance objective is different from the standard performance objective.

In one aspect, the modified performance objective may indicate the modified spherical coverage objective of the EIRP at the different percentile levels over the sphere around the UE. For example, the modified performance objective may indicate the UE to realize a first value of the EIRP at a first percentile level (e.g., $50^{th}$ percentile level) over the sphere around the UE.

In another example, the modified performance objective may indicate the UE to realize a second value of the EIRP at a second percentile level (e.g., $20^{th}$ percentile level) over the sphere around the UE. The second value of the EIRP at the second percentile level, per the modified performance objective, may be different than a value of the EIRP needed at the second percentile level, per the standard performance objective. For example, the table 800 of FIG. 8 shows a modified value of the EIRP (e.g., an effective EIRP value of 11.0 dBm, in accordance with the modified performance objective, per the capability information of the UE) at the $20^{th}$ percentile level over the sphere around the UE.

Referring back to FIG. 7, in some cases, to realize different values of the EIRP at the different percentile levels over the sphere, the UE may require a different amount/number of RSs for the beamforming for the different percentile levels over the sphere. The RSs may include synchronization signal blocks (SSBs).

In another aspect, the modified performance objective may indicate the modified spherical coverage objective of the EIS, at the different percentile levels over the sphere around the UE. For example, the modified performance objective may indicate the UE to realize a first value of the EIS at a first percentile level (e.g., 100 percentile level) over the sphere around the UE.

In another example, the modified performance objective may indicate the UE to realize a second value of the EIS at a second percentile level (e.g., $20^{th}$ percentile level) over the sphere around the UE. The second value of the EIS at the second percentile level, per the modified performance objective, may be different than a value of the EIS needed at the second percentile level, per the standard performance objective. For example, the table 800 of FIG. 8 shows a modified value of the EIS (e.g., an effective EIS value of −80.5 dBm, in accordance with the modified performance objective, per the capability information of the UE) at the $20^{th}$ percentile level over the sphere around the UE.

Referring back to FIG. 7, in some cases, to realize different values of the EIS at the different percentile levels over the sphere, the UE may require different amounts of RSs for the beamforming for the different percentile levels over the sphere.

In another aspect, the modified performance objective may indicate the modified spherical coverage objective of the EIRP and the EIS, at the different percentile levels over the sphere around the UE. For example, the modified performance objective may indicate the UE to realize a first value of the EIRP and a second value of the EIS at a first percentile level (e.g., 100 percentile level) over the sphere around the UE. In another example, the modified performance objective may indicate the UE to realize a third value of the EIRP and a fourth value of the EIS at a second percentile level (e.g., $20^{th}$ percentile level) over the sphere around the UE. These values of the EIRP/EIS according to the modified performance objective may be different than values of the EIRP/EIS according to the standard performance objective.

As indicated at 720, the gNB transmits the modified performance objective requirements for beamforming to the UE. The modified performance objectives may indicate the different amount of RSs required to achieve preferred performances at the different percentile levels of the sphere and are associated with a cost of beam weight learning.

In certain aspects, the different amounts of RSs may include a first number of RSs needed for realizing the performance at a top end (e.g., 100 percentile level) of the sphere that may be lower than a second number of RSs needed for realizing the performance at a tail end (e.g., $20^{th}$ percentile level) of the sphere.

For example, the first number of RSs (e.g., 10 RSs) may be needed for realizing the performance at a first percentile level (e.g., 100 percentile level) over the sphere around the UE and the second number of RSs (e.g., 20 RSs) may be needed for realizing the performance at a second percentile level (e.g., $20^{th}$ percentile level) over the sphere around the UE.

In another example, a third number of RSs (e.g., 15 RSs) may be needed for realizing the performance at a third percentile level (e.g., $50^{th}$ percentile level) over the sphere around the UE and the second number of RSs (e.g., 20 RSs) may be needed for realizing the performance at the second percentile level (e.g., $50^{th}$ percentile level) over the sphere around the UE.

As indicated at 725, the UE performs the beamforming, in accordance with the modified performance objective.

In certain aspects, the gNB may transmit an indication of a first RS overhead factor required to achieve a preferred performance at a first percentile level (e.g., performance at a tail end) of the sphere to the UE. The gNB determines a value of the first RS overhead factor based on the capability information of the UE.

In response to the receipt of the first RS overhead factor, the UE may transmit a response indicating whether the UE is able to achieve the preferred performance at the first percentile level of the sphere, in accordance with the first RS overhead factor, to the gNB.

In one example, the response may indicate that the UE is able to achieve the preferred performance at the first percentile level of the sphere, in accordance with the first RS overhead factor. In response to the receipt of the response, the gNB may determine and transmit a first configuration of RS resources, based on the first RS overhead factor, to the UE. The UE may perform the beamforming using one or more RSs, per the first configuration of RS resources.

In another example, the response may indicate that the UE is not able to achieve the preferred performance at the first percentile level of the sphere, in accordance with the first RS overhead factor. In such cases, the response may further indicate a second RS overhead factor required to achieve the preferred performance at the first percentile level of the sphere. A value of the second RS overhead factor is different from the value of the first RS overhead factor.

In response to the receipt of the second RS overhead factor, the gNB may accept or decline the value of the second RS overhead factor. In one example, the gNB declines the value of the second RS overhead factor (e.g., as the gNB may determine that such an RS overhead is not warranted for EIRP/EIS improvement for the UE). To grant RS resources appropriately, the gNB may transmit an indication of a third RS overhead factor required to achieve the preferred performance at the first percentile level of the sphere to the UE. A value of the third RS overhead factor is different from the value of the second RS overhead factor.

In another example, when the gNB accepts the value of the second RS overhead factor, the gNB may determine and transmit a second configuration of RS resources, based on the second RS overhead factor, to the UE. The UE may perform the beamforming using one or more RSs, per the second configuration of RS resources.

Figure 9:
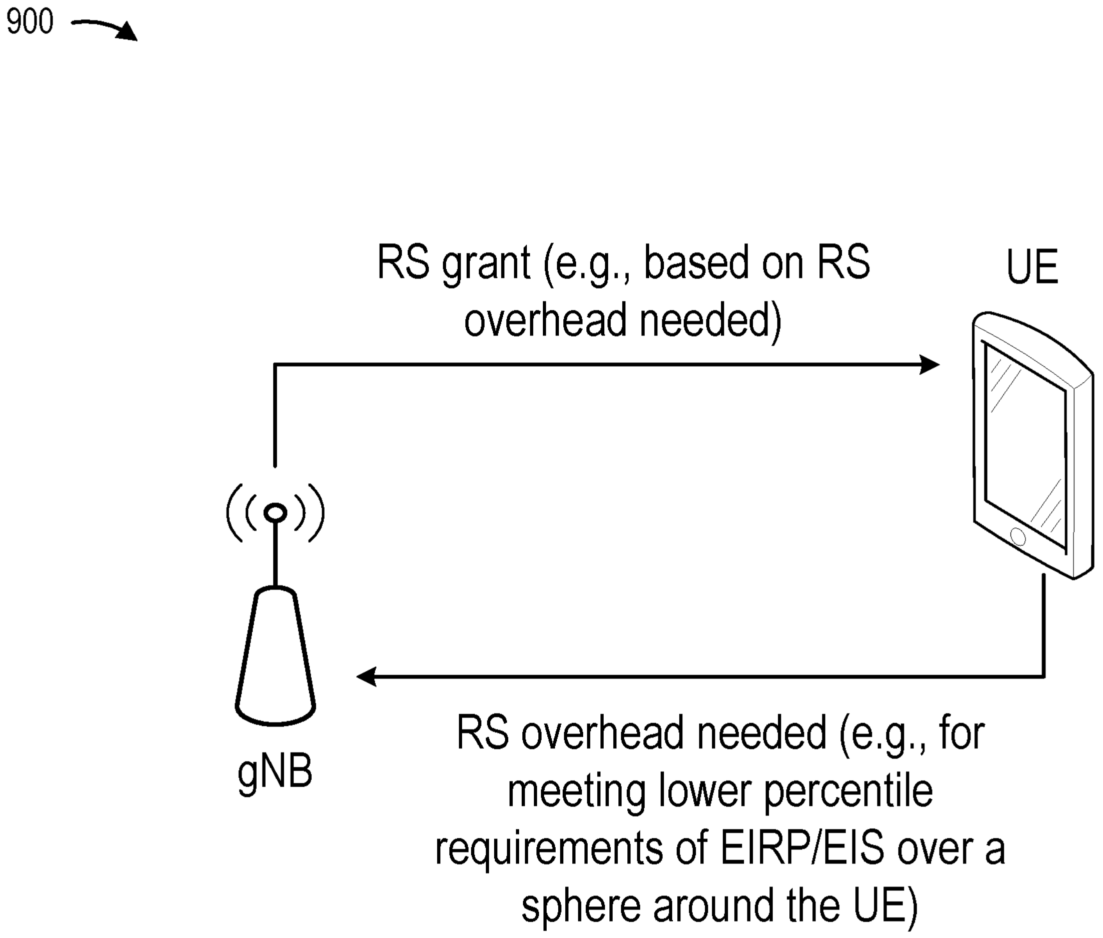
FIG. 9 depicts another call flow diagram illustrating example communication among a UE and a network entity.

In certain aspects, as depicted in a diagram 900 of FIG. 9, the UE initially transmits an indication of an RS overhead factor (e.g., a fourth RS overhead factor) required to achieve a preferred performance at a second percentile level (e.g., performance at a tail end) of the sphere to the gNB.

A value of the fourth RS overhead factor is based on the capability information of the UE. In one example, the fourth RS overhead factor may have a value lower than a threshold (e.g., when the UE is associated with multiple antenna arrays, and the tail performance (close to optimal) may be realized with a low RS overhead). In another example, the fourth RS overhead factor may have a value higher than the threshold (e.g., when the UE is associated with a single antenna array, and the tail performance (close to optimal) may be realized with a significant RS overhead).

As further depicted in the diagram 900 of FIG. 9, the gNB transmits a third configuration of RS resources (e.g., an RS grant), based on the fourth RS overhead factor, to the UE. The UE may perform the beamforming using one or more RSs, per the third configuration of RS resources.

Example Method for Wireless Communications at a User Equipment (UE)

FIG. 10 shows an example of a method 1000 for wireless communications at a user equipment (UE), such as the UE 104 of FIG. 1 and FIG. 3.

Method 1000 begins at step 1010 with transmitting signaling indicating capability information corresponding to one or more antenna arrays of the UE. In some cases, the operations of this step refer to, or may be performed by, circuitry for transmitting and/or code for transmitting as described with reference to FIG. 12.

Method 1000 then proceeds to step 1020 with receiving an indication of a modified performance objective for beamforming that is different from a standard performance objective indicating a first number of reference signals (RSs) required to achieve preferred performances at different percentile levels of a sphere around the UE. The modified performance objective is based on the capability information and indicates a second number of RSs required to achieve the preferred performances at the different percentile levels of the sphere. In some cases, the operations of this step refer to, or may be performed by, circuitry for receiving and/or code for receiving as described with reference to FIG. 12.

In certain aspects, the capability information includes at least one of: a number of the one or more antenna arrays; a number of antennas in each of the one or more antenna arrays; or a geometric shape of each of the one or more antenna arrays.

In certain aspects, the first number of RSs is different from the second number of RSs; the standard performance objective comprises a spherical coverage objective of at least one of: effective isotropic radiated power (EIRP) or effective isotropic sensitivity (EIS), at the different percentile levels over the sphere around the UE; and the modified performance objective includes a modified spherical coverage objective at the different percentile levels over the sphere around the UE.

In certain aspects, the modified performance objective indicates different amount of RSs required to achieve the preferred performances at the different percentile levels of the sphere.

In certain aspects, the different amount of RSs include a third number of RSs for a first percentile level and a fourth number of RSs for a second percentile level; the first percentile level is higher than the second percentile level; and the third number of RSs is lower than the fourth number of RSs.

In certain aspects, the method 1000 further includes receiving an indication of a first RS overhead factor required to achieve a preferred performance at a first percentile level of the sphere. The first RS overhead factor is based on the capability information.

In certain aspects, the method 1000 further includes transmitting a response indicating whether the UE is able to achieve the preferred performance at the first percentile level of the sphere, in accordance with the first RS overhead factor.

In certain aspects, the response indicates that the UE is not able to achieve the preferred performance at the first percentile level of the sphere, in accordance with the first RS overhead factor.

In certain aspects, the response further indicates a second RS overhead factor required to achieve the preferred performance at the first percentile level of the sphere, wherein the second RS overhead factor is different from the first RS overhead factor.

In certain aspects, the method 1000 further includes receiving a configuration of RS resources, based on the second RS overhead factor.

In certain aspects, the method 1000 further includes transmitting an indication of a first RS overhead factor required to achieve a preferred performance at a first percentile level of the sphere. The first RS overhead factor is based on the capability information.

In certain aspects, the method 1000 further includes receiving a configuration of RS resources, based on the first RS overhead factor.

Figure 12:
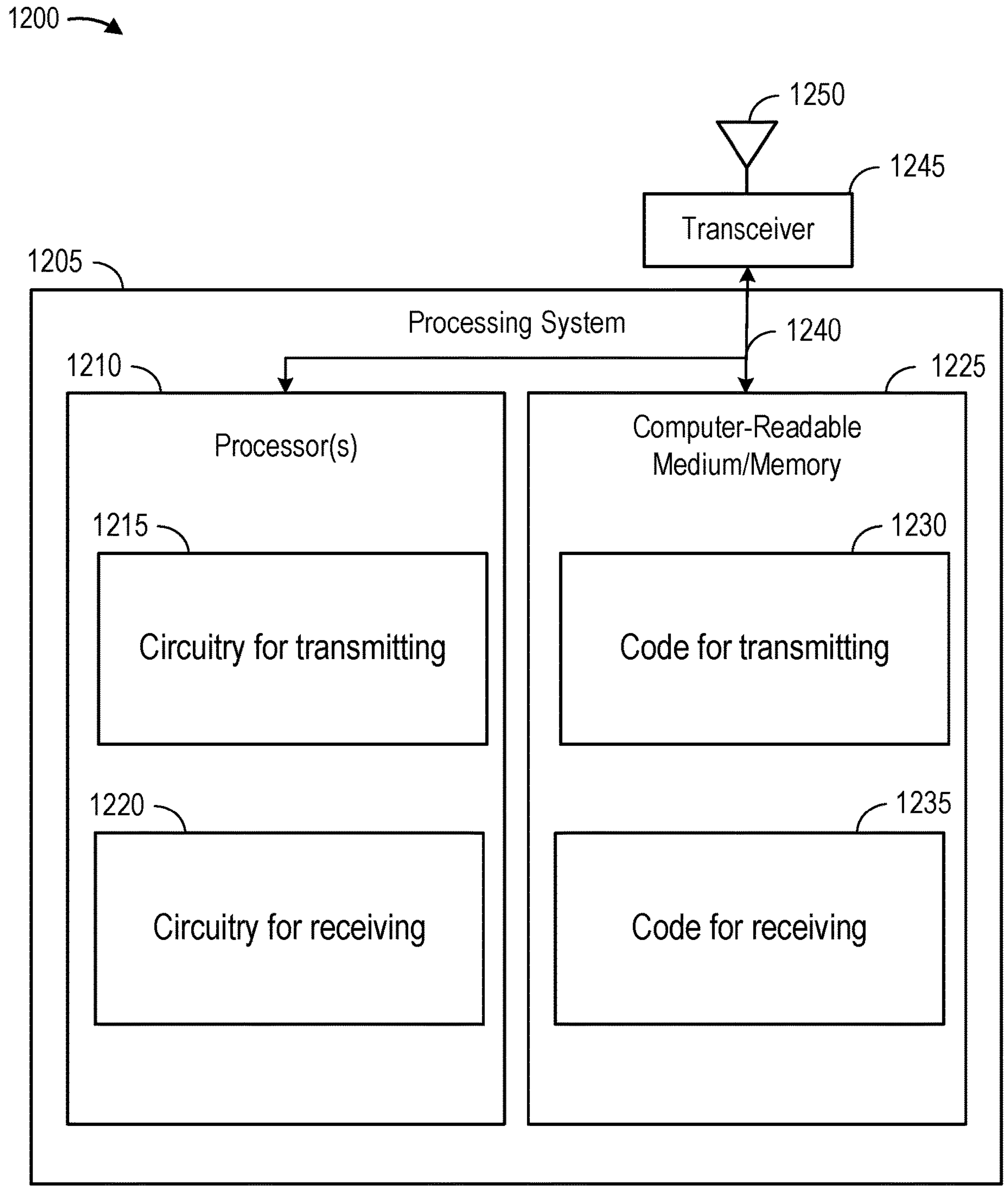
FIG. 12 and FIG. 13 depict example communications devices.

In one aspect, the method 1000, or any aspect related to it, may be performed by an apparatus, such as a communications device 1200 of FIG. 12, which includes various components operable, configured, or adapted to perform the method 1000. The communications device 1200 is described below in further detail.

Note that FIG. 10 is just one example of a method, and other methods including fewer, additional, or alternative steps are possible consistent with this disclosure.

Example Method for Wireless Communications at a Network Entity

Figure 11:
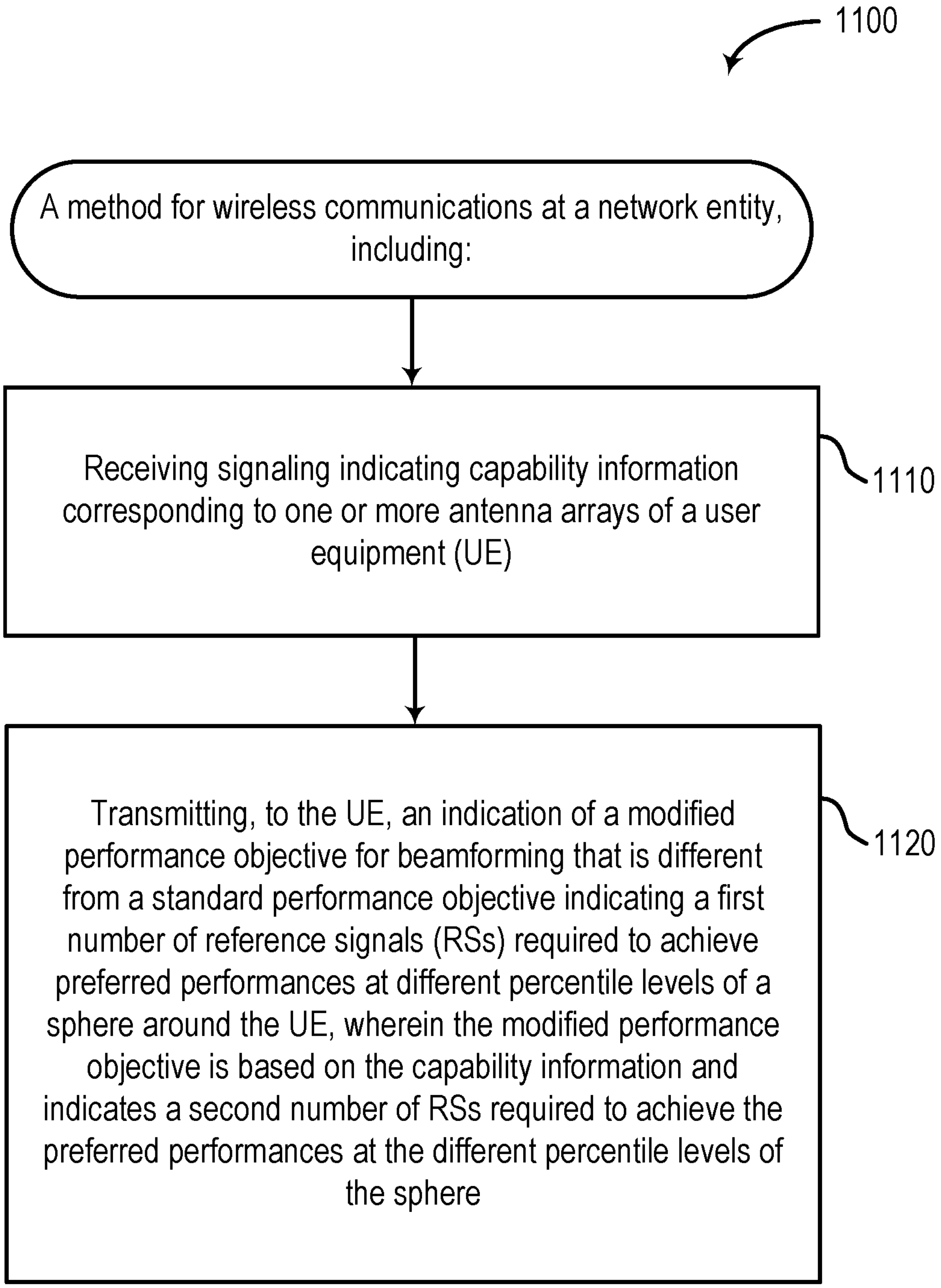
FIG. 11 depicts a method for wireless communications at a network entity.

FIG. 11 shows an example of a method 1100 for wireless communications at a network entity, such as the BS 102 of FIG. 1 and FIG. 3.

Method 1100 begins at step 1110 with receiving signaling indicating capability information corresponding to one or more antenna arrays of a user equipment (UE). In some cases, the operations of this step refer to, or may be performed by, circuitry for receiving and/or code for receiving as described with reference to FIG. 13.

Method 1100 then proceeds to step 1120 with transmitting, to the UE, an indication of a modified performance objective for beamforming that is different from a standard performance objective indicating a first number of reference signals (RSs) required to achieve preferred performances at different percentile levels of a sphere around the UE. The modified performance objective is based on the capability information and indicates a second number of RSs required to achieve the preferred performances at the different percentile levels of the sphere. In some cases, the operations of this step refer to, or may be performed by, circuitry for transmitting and/or code for transmitting as described with reference to FIG. 13.

In certain aspects, the capability information includes at least one of: a number of the one or more antenna arrays; a number of antennas in each of the one or more antenna arrays; or a geometric shape of each of the one or more antenna arrays.

In certain aspects, the first number of RSs is different from the second number of RSs; the standard performance objective comprises a spherical coverage objective of at least one of: effective isotropic radiated power (EIRP) or effective isotropic sensitivity (EIS), at the different percentile levels over the sphere around the UE; and the modified performance objective includes a modified spherical coverage objective at the different percentile levels over the sphere around the UE.

In certain aspects, the modified performance objective indicates different amount of RSs required to achieve the preferred performances at the different percentile levels of the sphere.

In certain aspects, the different amount of RSs include a third number of RSs for a first percentile level and a fourth number of RSs for a second percentile level; the first percentile level is higher than the second percentile level; and the third number of RSs is lower than the fourth number of RSs.

In certain aspects, the method 1100 further includes transmitting an indication of a first RS overhead factor required to achieve a preferred performance at a first percentile level of the sphere. The first RS overhead factor is based on the capability information.

In certain aspects, the method 1100 further includes receiving a response indicating whether the UE is able to achieve the preferred performance at the first percentile level of the sphere, in accordance with the first RS overhead factor.

In certain aspects, the response indicates that the UE is not able to achieve the preferred performance at the first percentile level of the sphere, in accordance with the first RS overhead factor.

In certain aspects, the response further indicates a second RS overhead factor required to achieve the preferred performance at the first percentile level of the sphere. The second RS overhead factor is different from the first RS overhead factor.

In certain aspects, the method 1100 further includes transmitting a configuration of RS resources, based on the second RS overhead factor.

In certain aspects, the method 1100 further includes receiving an indication of a first RS overhead factor required to achieve a preferred performance at a first percentile level of the sphere. The first RS overhead factor is based on the capability information.

In certain aspects, the method 1100 further includes transmitting a configuration of RS resources, based on the first RS overhead factor.

Figure 13:
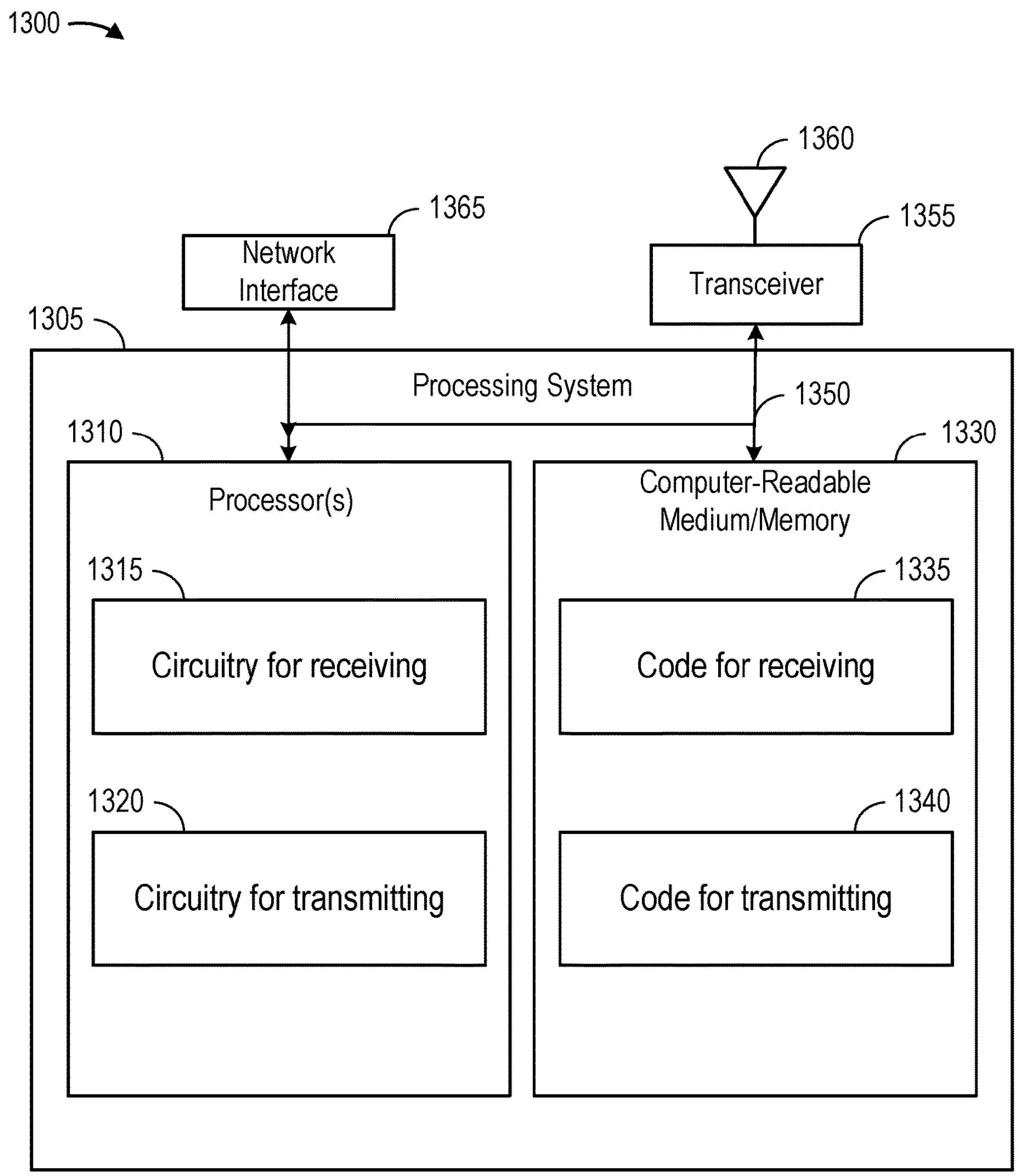

In one aspect, the method 1100, or any aspect related to it, may be performed by an apparatus, such as a communications device 1300 of FIG. 13, which includes various components operable, configured, or adapted to perform the method 1100. The communications device 1300 is described below in further detail.

Note that FIG. 11 is just one example of a method, and other methods including fewer, additional, or alternative steps are possible consistent with this disclosure.

Example Communications Devices

FIG. 12 depicts aspects of an example communications device 1200. In some aspects, communications device 1200 is a user equipment (UE), such as UE 104 described above with respect to FIG. 1 and FIG. 3.

The communications device 1200 includes a processing system 1205 coupled to a transceiver 1245 (e.g., a transmitter and/or a receiver). The transceiver 1245 is configured to transmit and receive signals for the communications device 1200 via an antenna 1250, such as the various signals as described herein. The processing system 1205 may be configured to perform processing functions for the communications device 1200, including processing signals received and/or to be transmitted by the communications device 1200.

The processing system 1205 includes one or more processors 1210. In various aspects, the one or more processors 1210 may be representative of one or more of receive processor 358, transmit processor 364, TX MIMO processor 366, and/or controller/processor 380, as described with respect to FIG. 3. The one or more processors 1210 are coupled to a computer-readable medium/memory 1225 via a bus 1240. In certain aspects, the computer-readable medium/memory 1225 is configured to store instructions (e.g., computer-executable code) that when executed by the one or more processors 1210, cause the one or more processors 1210 to perform the method 1000 described with respect to FIG. 10, and/or any aspect related to it. Note that reference to a processor performing a function of communications device 1200 may include the one or more processors 1210 performing that function of communications device 1200.

In the depicted example, computer-readable medium/memory 1225 stores code (e.g., executable instructions), such as code for transmitting 1230 and code for receiving 1235. Processing of the code for transmitting 1230 and the code for receiving 1235 may cause the communications device 1200 to perform the method 1000 described with respect to FIG. 10, and/or any aspect related to it.

The one or more processors 1210 include circuitry configured to implement (e.g., execute) the code stored in the computer-readable medium/memory 1225, including circuitry such as circuitry for transmitting 1215 and circuitry for receiving 1220. Processing with the circuitry for transmitting 1215 and the circuitry for receiving 1220 may cause the communications device 1200 to perform the method 1000 described with respect to FIG. 10, and/or any aspect related to it.

Various components of the communications device 1200 may provide means for performing the method 1000 described with respect to FIG. 10, and/or any aspect related to it. For example, means for transmitting, sending or outputting for transmission may include transceivers 354 and/or antenna(s) 352 of the UE 104 illustrated in FIG. 3 and/or the code for transmitting 1230, the circuitry for transmitting 1215, the transceiver 1245 and the antenna 1250 of the communications device 1200 in FIG. 12. Means for receiving or obtaining may include transceivers 354 and/or antenna(s) 352 of the UE 104 illustrated in FIG. 3 and/or the code for receiving 1235, the circuitry for receiving 1220, the transceiver 1245 and the antenna 1250 of the communications device 1200 in FIG. 12.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 12 is an example, and many other examples and configurations of communication device 1200 are possible.

FIG. 13 depicts aspects of an example communications device 1300. In some aspects, communications device 1300 is a network entity, such as BS 102 of FIG. 1 and FIG. 3, or a disaggregated base station as discussed with respect to FIG. 2.

The communications device 1300 includes a processing system 1305 coupled to a transceiver 1355 (e.g., a transmitter and/or a receiver) and/or a network interface 1365. The transceiver 1355 is configured to transmit and receive signals for the communications device 1300 via an antenna 1360, such as the various signals as described herein. The network interface 1365 is configured to obtain and send signals for the communications device 1300 via communication link(s), such as a backhaul link, midhaul link, and/or fronthaul link as described herein, such as with respect to FIG. 2. The processing system 1305 may be configured to perform processing functions for the communications device 1300, including processing signals received and/or to be transmitted by the communications device 1300.

The processing system 1305 includes one or more processors 1310. In various aspects, one or more processors 1310 may be representative of one or more of receive processor 338, transmit processor 320, TX MIMO processor 330, and/or controller/processor 340, as described with respect to FIG. 3. The one or more processors 1310 are coupled to a computer-readable medium/memory 1330 via a bus 1350. In certain aspects, the computer-readable medium/memory 1330 is configured to store instructions (e.g., computer-executable code) that when executed by the one or more processors 1310, cause the one or more processors 1310 to perform the method 1100 described with respect to FIG. 11, or any aspect related to it. Note that reference to a processor of communications device 1300 performing a function may include the one or more processors 1310 of communications device 1300 performing that function.

In the depicted example, the computer-readable medium/memory 1330 stores code (e.g., executable instructions), such as code for receiving 1335 and code for transmitting 1340. Processing of the code for receiving 1335 and the code for transmitting 1340 may cause the communications device 1300 to perform the method 1100 described with respect to FIG. 11, or any aspect related to it.

The one or more processors 1310 include circuitry configured to implement (e.g., execute) the code stored in the computer-readable medium/memory 1330, including circuitry such as circuitry for receiving 1315 and circuitry for transmitting 1320. Processing with the circuitry for receiving 1315 and the circuitry for transmitting 1320 may cause the communications device 1300 to perform the method 1100 described with respect to FIG. 11, or any aspect related to it.

Various components of the communications device 1300 may provide means for performing the method 1100 described with respect to FIG. 11, or any aspect related to it. Means for transmitting, sending or outputting for transmission may include transceivers 332 and/or antenna(s) 334 of the BS 102 illustrated in FIG. 3 and/or the circuitry for transmitting 1320, the code for transmitting 1340, the transceiver 1355 and the antenna 1360 of the communications device 1300 in FIG. 13. Means for receiving or obtaining may include transceivers 332 and/or antenna(s) 334 of the BS 102 illustrated in FIG. 3 and/or the circuitry for receiving 1315, the code for receiving 1335, the transceiver 1355 and the antenna 1360 of the communications device 1300 in FIG. 13.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 13 is an example, and many other examples and configurations of communication device 1300 are possible.

EXAMPLE CLAUSES

Implementation examples are described in the following numbered clauses:

Clause 1: A method for wireless communications at a user equipment (UE), including: transmitting signaling indicating capability information corresponding to one or more antenna arrays of the UE; and receiving an indication of a modified performance objective for beamforming that is different from a standard performance objective indicating a first number of reference signals (RSs) required to achieve preferred performances at different percentile levels of a sphere around the UE, wherein the modified performance objective is based on the capability information and indicates a second number of RSs required to achieve the preferred performances at the different percentile levels of the sphere.

Clause 2: The method of clause 1, wherein the capability information comprises at least one of: a number of the one or more antenna arrays; a number of antennas in each of the one or more antenna arrays; or a geometric shape of each of the one or more antenna arrays.

Clause 3: The method of any one of clauses 1-2, wherein the first number of RSs is different from the second number of RSs; the standard performance objective comprises a spherical coverage objective of at least one of: effective isotropic radiated power (EIRP) or effective isotropic sensitivity (EIS), at the different percentile levels over the sphere around the UE; and the modified performance objective includes a modified spherical coverage objective at the different percentile levels over the sphere around the UE.

Clause 4: The method of clause 3, wherein the modified performance objective indicates different amount of RSs required to achieve the preferred performances at the different percentile levels of the sphere.

Clause 5: The method of clause 4, wherein: the different amount of RSs comprise a third number of RSs for a first percentile level and a fourth number of RSs for a second percentile level; the first percentile level is higher than the second percentile level; and the third number of RSs is lower than the fourth number of RSs.

Clause 6: The method of clause 3, further including receiving an indication of a first RS overhead factor required to achieve a preferred performance at a first percentile level of the sphere, wherein the first RS overhead factor is based on the capability information.

Clause 7: The method of clause 6, further including transmitting a response indicating whether the UE is able to achieve the preferred performance at the first percentile level of the sphere, in accordance with the first RS overhead factor.

Clause 8: The method of clause 7, wherein the response indicates that the UE is not able to achieve the preferred performance at the first percentile level of the sphere, in accordance with the first RS overhead factor.

Clause 9: The method of clause 8, wherein the response further indicates a second RS overhead factor required to achieve the preferred performance at the first percentile level of the sphere, wherein the second RS overhead factor is different from the first RS overhead factor.

Clause 10: The method of clause 9, further including receiving a configuration of RS resources, based on the second RS overhead factor.

Clause 11: The method of clause 3, further including transmitting an indication of a first RS overhead factor required to achieve a preferred performance at a first percentile level of the sphere, wherein the first RS overhead factor is based on the capability information.

Clause 12: The method of clause 11, further including receiving a configuration of RS resources, based on the first RS overhead factor.

Clause 13: A method for wireless communications at a network entity, including: receiving signaling indicating capability information corresponding to one or more antenna arrays of a user equipment (UE); and transmitting, to the UE, an indication of a modified performance objective for beamforming that is different from a standard performance objective indicating a first number of reference signals (RSs) required to achieve preferred performances at different percentile levels of a sphere around the UE, wherein the modified performance objective is based on the capability information and indicates a second number of RSs required to achieve the preferred performances at the different percentile levels of the sphere.

Clause 14: The method of clause 13, wherein the capability information comprises at least one of: a number of the one or more antenna arrays; a number of antennas in each of the one or more antenna arrays; or a geometric shape of each of the one or more antenna arrays.

Clause 15: The method of any one of clauses 13-14, wherein the first number of RSs is different from the second number of RSs; the standard performance objective comprises a spherical coverage objective of at least one of: effective isotropic radiated power (EIRP) or effective isotropic sensitivity (EIS), at the different percentile levels over the sphere around the UE; and the modified performance objective includes a modified spherical coverage objective at the different percentile levels over the sphere around the UE.

Clause 16: The method of clause 15, wherein the modified performance objective indicates different amount of RSs required to achieve preferred performances at the different percentile levels of the sphere.

Clause 17: The method of clause 16, wherein: the different amount of RSs comprise a third number of RSs for a first percentile level and a fourth number of RSs for a second percentile level; the first percentile level is higher than the second percentile level; and the third number of RSs is lower than the fourth number of RSs.

Clause 18: The method of clause 15, further including transmitting an indication of a first RS overhead factor required to achieve a preferred performance at a first percentile level of the sphere, wherein the first RS overhead factor is based on the capability information.

Clause 19: The method of clause 18, further including receiving a response indicating whether the UE is able to achieve the preferred performance at the first percentile level of the sphere, in accordance with the first RS overhead factor.

Clause 20: The method of clause 19, wherein the response indicates that the UE is not able to achieve the preferred performance at the first percentile level of the sphere, in accordance with the first RS overhead factor.

Clause 21: The method of clause 20, wherein the response further indicates a second RS overhead factor required to achieve the preferred performance at the first percentile level of the sphere, wherein the second RS overhead factor is different from the first RS overhead factor.

Clause 22: The method of clause 21, further including transmitting a configuration of RS resources, based on the second RS overhead factor.

Clause 23: The method of clause 15, further including receiving an indication of a first RS overhead factor required to achieve a preferred performance at a first percentile level of the sphere, wherein the first RS overhead factor is based on the capability information.

Clause 24: The method of clause 23, further including transmitting a configuration of RS resources, based on the first RS overhead factor.

Clause 25: An apparatus, comprising: a memory comprising executable instructions; and one or more processors configured, individually or in any combination, to execute the executable instructions and cause the apparatus to perform a method in accordance with any one of Clauses 1-24.

Clause 26: An apparatus, comprising means for performing a method in accordance with any one of Clauses 1-24.

Clause 27: A non-transitory computer-readable medium comprising executable instructions that, when executed by one or more processors of an apparatus, cause the apparatus to perform a method in accordance with any one of Clauses 1-24.

Clause 28: A computer program product embodied on a computer-readable storage medium comprising code for performing a method in accordance with any one of Clauses 1-24.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a user equipment (UE), comprising:

one or more memories comprising instructions; and one or more processors configured, individually or in any combination, to execute the instructions and cause the apparatus to:

transmit signaling indicating capability information to a network entity, wherein the capability information comprises at least antenna information corresponding to one or more antenna arrays of the UE; and receive an indication from the network entity of a dynamically modified performance objective for beamforming that is different from a standard performance objective, wherein the standard performance objective indicates a first number of reference signals (RSs) required to achieve preferred performances at different percentile levels of a sphere around the UE, wherein the dynamically modified performance objective specifies a second number of RSs determined based on the antenna information that are required to achieve the preferred performances at the different percentile levels of the sphere, and wherein different number of RSs are required to achieve the preferred performances at the different percentile levels of the sphere in accordance with the dynamically modified performance objective.

2. The apparatus of claim 1, wherein the antenna information comprises at least one of:

a number of the one or more antenna arrays;

a number of antennas in each of the one or more antenna arrays; or a geometric shape of each of the one or more antenna arrays.

3. The apparatus of claim 1, wherein:

the first number of RSs is different from the second number of RSs;

the standard performance objective comprises a spherical coverage objective of at least one of: effective isotropic radiated power (EIRP) or effective isotropic sensitivity (EIS), at the different percentile levels over the sphere around the UE; and the dynamically modified performance objective comprises a modified spherical coverage objective at the different percentile levels over the sphere around the UE.

4. The apparatus of claim 3, wherein the dynamically modified performance objective indicates different amount of RSs required to achieve the preferred performances at the different percentile levels of the sphere, and wherein a number of RSs needed for realizing a performance at a top end of the sphere is lower than a number of RSs needed for realizing a performance at a tail end of the sphere.

5. The apparatus of claim 4, wherein:

the different amount of RSs comprise a third number of RSs for a first percentile level and a fourth number of RSs for a second percentile level;

the first percentile level is higher than the second percentile level; and the third number of RSs is lower than the fourth number of RSs.

6. The apparatus of claim 3, wherein the one or more processors are further configured to execute the instructions and cause the apparatus to receive an indication of a first RS overhead factor required to achieve a preferred performance at a first percentile level of the sphere, wherein the first RS overhead factor is based on the capability information.

7. The apparatus of claim 6, wherein the one or more processors are further configured to execute the instructions and cause the apparatus to transmit a response indicating whether the UE is able to achieve the preferred performance at the first percentile level of the sphere, in accordance with the first RS overhead factor.

8. The apparatus of claim 7, wherein the response indicates that the UE is not able to achieve the preferred performance at the first percentile level of the sphere, in accordance with the first RS overhead factor.

9. The apparatus of claim 8, wherein the response further indicates a second RS overhead factor required to achieve the preferred performance at the first percentile level of the sphere, wherein the second RS overhead factor is different from the first RS overhead factor.

10. The apparatus of claim 9, wherein the one or more processors are further configured to execute the instructions and cause the apparatus to receive a configuration of RS resources, based on the second RS overhead factor.

11. The apparatus of claim 3, wherein the one or more processors are further configured to execute the instructions and cause the apparatus to transmit an indication of a first RS overhead factor required to achieve a preferred performance at a first percentile level of the sphere, wherein the first RS overhead factor is based on the capability information.

12. The apparatus of claim 11, wherein the one or more processors are further configured to execute the instructions and cause the apparatus to receive a configuration of RS resources, based on the first RS overhead factor.

13. An apparatus for wireless communications at a network entity, comprising:

one or more memories comprising instructions; and one or more processors configured, individually or in any combination, to execute the instructions and cause the apparatus to:

receive signaling indicating capability information from a user equipment (UE), wherein the capability information comprises at least antenna information corresponding to one or more antenna arrays of the UE; and transmit, to the UE, an indication of a dynamically modified performance objective for beamforming that is different from a standard performance objective, wherein the standard performance objective indicates a first number of reference signals (RSs) required to achieve preferred performances at different percentile levels of a sphere around the UE, wherein the dynamically modified performance objective specifies a second number of RSs determined based on the antenna information that are required to achieve the preferred performances at the different percentile levels of the sphere, and wherein different number of RSs are required to achieve the preferred performances at the different percentile levels of the sphere in accordance with the dynamically modified performance objective.

14. The apparatus of claim 13, wherein the antenna information comprises at least one of:

a number of the one or more antenna arrays;

a number of antennas in each of the one or more antenna arrays; or a geometric shape of each of the one or more antenna arrays.

15. The apparatus of claim 13, wherein:

the first number of RSs is different from the second number of RSs;

the standard performance objective comprises a spherical coverage objective of at least one of: effective isotropic radiated power (EIRP) or effective isotropic sensitivity (EIS), at the different percentile levels over the sphere around the UE; and the dynamically modified performance objective comprises a modified spherical coverage objective at the different percentile levels over the sphere around the UE.

16. The apparatus of claim 15, wherein the dynamically modified performance objective indicates different amount of RSs required to achieve the preferred performances at the different percentile levels of the sphere, and wherein a number of RSs needed for realizing a performance at a top end of the sphere is lower than a number of RSs needed for realizing a performance at a tail end of the sphere.

17. The apparatus of claim 16, wherein:

the different amount of RSs comprise a third number of RSs for a first percentile level and a fourth number of RSs for a second percentile level;

the first percentile level is higher than the second percentile level; and the third number of RSs is lower than the fourth number of RSs.

18. The apparatus of claim 15, wherein the one or more processors are further configured to execute the instructions and cause the apparatus to transmit an indication of a first RS overhead factor required to achieve a preferred performance at a first percentile level of the sphere, wherein the first RS overhead factor is based on the capability information.

19. The apparatus of claim 18, wherein the one or more processors are further configured to execute the instructions and cause the apparatus to receive a response indicating whether the UE is able to achieve the preferred performance at the first percentile level of the sphere, in accordance with the first RS overhead factor.

20. The apparatus of claim 19, wherein the response indicates that the UE is not able to achieve the preferred performance at the first percentile level of the sphere, in accordance with the first RS overhead factor.

21. The apparatus of claim 20, wherein the response further indicates a second RS overhead factor required to achieve the preferred performance at the first percentile level of the sphere, wherein the second RS overhead factor is different from the first RS overhead factor.

22. The apparatus of claim 21, wherein the one or more processors are further configured to execute the instructions and cause the apparatus to transmit a configuration of RS resources, based on the second RS overhead factor.

23. The apparatus of claim 15, wherein the one or more processors are further configured to execute the instructions and cause the apparatus to receive an indication of a first RS overhead factor required to achieve a preferred performance at a first percentile level of the sphere, wherein the first RS overhead factor is based on the capability information.

24. The apparatus of claim 23, wherein the one or more processors are further configured to execute the instructions and cause the apparatus to transmit a configuration of RS resources, based on the first RS overhead factor.

25. A method for wireless communications at a user equipment (UE), comprising:

transmitting signaling indicating capability information to a network entity, wherein the capability information comprises at least antenna information corresponding to one or more antenna arrays of the UE; and receiving an indication from the network entity of a dynamically modified performance objective for beamforming that is different from a standard performance objective, wherein the standard performance objective indicates a first number of reference signals (RSs) required to achieve preferred performances at different percentile levels of a sphere around the UE, wherein the dynamically modified performance objective specifies a second number of RSs determined based on the antenna information that are required to achieve the preferred performances at the different percentile levels of the sphere, and wherein different number of RSs are required to achieve the preferred performances at the different percentile levels of the sphere in accordance with the dynamically modified performance objective.

26. The method of claim 25, wherein the antenna information comprises at least one of:

a number of the one or more antenna arrays;

a number of antennas in each of the one or more antenna arrays; or a geometric shape of each of the one or more antenna arrays.

27. The method of claim 25, wherein:

the first number of RSs is different from the second number of RSs;

the standard performance objective comprises a spherical coverage objective of at least one of: effective isotropic radiated power (EIRP) or effective isotropic sensitivity (EIS), at the different percentile levels over the sphere around the UE; and the dynamically modified performance objective comprises a modified spherical coverage objective at the different percentile levels over the sphere around the UE.

28. A method for wireless communications at a network entity, comprising:

receiving signaling indicating capability information from a user equipment (UE), wherein the capability information comprises at least antenna information corresponding to one or more antenna arrays of the UE; and transmitting, to the UE, an indication of a dynamically modified performance objective for beamforming that is different from a standard performance objective, wherein the standard performance objective indicates a first number of reference signals (RSs) required to achieve preferred performances at different percentile levels of a sphere around the UE, wherein the dynamically modified performance objective specifies a second number of RSs determined based on the antenna information that are required to achieve the preferred performances at the different percentile levels of the sphere, and wherein different number of RSs are required to achieve the preferred performances at the different percentile levels of the sphere in accordance with the dynamically modified performance objective.

29. The method of claim 28, wherein the antenna information comprises at least one of:

a number of the one or more antenna arrays;

a number of antennas in each of the one or more antenna arrays; or a geometric shape of each of the one or more antenna arrays.

30. The method of claim 28, wherein:

the first number of RSs is different from the second number of RSs;

the standard performance objective comprises a spherical coverage objective of at least one of: effective isotropic radiated power (EIRP) or effective isotropic sensitivity (EIS), at the different percentile levels over the sphere around the UE; and the dynamically modified performance objective comprises a modified spherical coverage objective at the different percentile levels over the sphere around the UE.

* * * * *